United States Patent
Danilov et al.

(10) Patent No.: US 11,971,850 B2
(45) Date of Patent: Apr. 30, 2024

(54) DEMOTED DATA RETENTION VIA A TIERED ORDERED EVENT STREAM DATA STORAGE SYSTEM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 166 days.

(21) Appl. No.: 17/503,024

(22) Filed: Oct. 15, 2021

(65) Prior Publication Data
US 2023/0123596 A1    Apr. 20, 2023

(51) Int. Cl.
| G06F 16/00 | (2019.01) |
| G06F 16/11 | (2019.01) |
| G06F 16/18 | (2019.01) |
| G06F 16/185 | (2019.01) |

(52) U.S. Cl.
CPC ........ *G06F 16/125* (2019.01); *G06F 16/1805* (2019.01); *G06F 16/185* (2019.01)

(58) Field of Classification Search
CPC ... G06F 16/125; G06F 16/1805; G06F 16/185
See application file for complete search history.

(56) References Cited

U.S. PATENT DOCUMENTS

| 3,617,587 A | 11/1971 | Nayar et al. |
| 5,826,977 A | 10/1998 | Fowler et al. |
(Continued)

FOREIGN PATENT DOCUMENTS

| CA | 2534170 A1 | 7/2007 |
| CA | 2672879 A1 | 4/2008 |
(Continued)

OTHER PUBLICATIONS

Non Final Office Action received for U.S. Appl. No. 18/164,744 dated Aug. 31, 2023, 46 pages.
(Continued)

*Primary Examiner* — Alex Gofman
*Assistant Examiner* — Suman Rajaputra
(74) *Attorney, Agent, or Firm* — Amin, Turocy & Watson, LLP

(57) ABSTRACT

Data retention for a tiered ordered event stream (OES) data storage system is disclosed. Data retention can be applied to demoted data, e.g., data demoted from a first tier to a second tier of data storage devices. The data retention disclosed can avoid demoted events, generally aggregated via a chunk object, file object, etc., from being subject to both a stream-cut operation and a retention period. In embodiments, where a stream-cut instance corresponds to events occurring later in time than a retention end time (RET), all demoted events, e.g., as aggregated by a chunk, file, etc., can be affiliated with the RET. However, where the stream-cut instance corresponds to events occurring earlier in time than the RET, then a portion of the events, e.g., those that will be truncated by performing the stream-cut instance, can be demoted and affiliated with the RET.

20 Claims, 10 Drawing Sheets

(56) References Cited

U.S. PATENT DOCUMENTS

| | | |
|---|---|---|
| 7,107,419 B1 * | 9/2006 | Ghemawat ............. G06F 16/10 711/112 |
| 7,340,690 B2 | 3/2008 | Lau |
| 7,430,570 B1 | 9/2008 | Srinivasan et al. |
| 7,610,437 B2 | 10/2009 | Sinclair et al. |
| 7,769,717 B2 | 8/2010 | Federwisch et al. |
| 7,984,084 B2 | 7/2011 | Sinclair |
| 8,285,918 B2 | 10/2012 | Maheshwari |
| 8,443,263 B2 | 5/2013 | Selinger et al. |
| 8,572,091 B1 | 10/2013 | Sivasubramanian et al. |
| 8,655,825 B2 | 2/2014 | Roesch et al. |
| 8,732,403 B1 | 5/2014 | Nayak |
| 8,825,848 B1 | 9/2014 | Dotan et al. |
| 8,873,284 B2 | 10/2014 | Sinclair et al. |
| 8,984,248 B2 | 3/2015 | Morishita et al. |
| 9,223,693 B2 | 12/2015 | Sinclair et al. |
| 9,336,133 B2 | 5/2016 | Sinclair et al. |
| 9,348,746 B2 | 5/2016 | Sinclair et al. |
| 9,407,521 B1 | 8/2016 | Kulkarni |
| 9,465,731 B2 | 10/2016 | Sinclair et al. |
| 9,514,018 B2 | 12/2016 | Sikri |
| 9,591,316 B2 | 3/2017 | Bracha et al. |
| 9,639,589 B1 | 5/2017 | Theimer |
| 9,715,434 B1 | 6/2017 | Xu et al. |
| 9,734,050 B2 | 8/2017 | Sinclair et al. |
| 9,734,911 B2 | 8/2017 | Sinclair et al. |
| 9,753,932 B1 | 9/2017 | Brow et al. |
| 9,778,855 B2 | 10/2017 | Sinclair |
| 9,892,803 B2 | 2/2018 | Reed |
| 9,898,482 B1 | 2/2018 | Bono |
| 9,965,215 B1 | 5/2018 | Vazhenin et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,133,490 B2 | 11/2018 | Sinclair et al. |
| 10,255,179 B2 | 4/2019 | Ji et al. |
| 10,277,524 B1 | 4/2019 | Kaitha et al. |
| 10,338,834 B1 | 7/2019 | Dighe et al. |
| 10,338,958 B1 * | 7/2019 | Kamboj ............... G06F 9/3851 |
| 10,430,279 B1 | 10/2019 | Dittia et al. |
| 10,565,208 B2 | 2/2020 | Triou, Jr. et al. |
| 10,628,424 B2 | 4/2020 | Park et al. |
| 10,705,741 B1 | 7/2020 | Varadarajan et al. |
| 10,795,812 B1 | 10/2020 | Duggal et al. |
| 10,860,457 B1 | 12/2020 | Evenson et al. |
| 10,867,033 B2 | 12/2020 | Keren et al. |
| 10,891,228 B2 | 1/2021 | Burow |
| 10,909,174 B1 * | 2/2021 | Martin ................. G06N 5/022 |
| 10,929,322 B2 | 2/2021 | McDonald et al. |
| 10,983,715 B2 | 4/2021 | Sharoni et al. |
| 11,016,826 B2 | 5/2021 | Lehmann |
| 11,086,537 B2 | 8/2021 | Byun |
| 11,194,638 B1 | 12/2021 | Danilov et al. |
| 11,314,779 B1 | 4/2022 | Jain |
| 11,354,054 B2 | 6/2022 | Danilov et al. |
| 2004/0199524 A1 | 10/2004 | Rys et al. |
| 2005/0025152 A1 | 2/2005 | Georgiou et al. |
| 2005/0055519 A1 * | 3/2005 | Stuart .................. G06F 16/122 711/159 |
| 2006/0036568 A1 | 2/2006 | Moore et al. |
| 2006/0058987 A1 | 3/2006 | Kumar et al. |
| 2007/0033325 A1 | 2/2007 | Sinclair et al. |
| 2007/0047635 A1 | 3/2007 | Stojanovic et al. |
| 2007/0220518 A1 | 9/2007 | Verbowski et al. |
| 2008/0037549 A1 | 2/2008 | Haardt et al. |
| 2008/0059724 A1 | 3/2008 | Stifter, Jr. |
| 2008/0082596 A1 | 4/2008 | Gorobets |
| 2008/0144079 A1 | 6/2008 | Pandey et al. |
| 2008/0184262 A1 | 7/2008 | Ginis et al. |
| 2008/0189477 A1 | 8/2008 | Asano et al. |
| 2008/0288713 A1 | 11/2008 | Lee et al. |
| 2008/0301135 A1 | 12/2008 | Alves et al. |
| 2009/0182784 A1 | 7/2009 | Rohit et al. |
| 2010/0083098 A1 | 4/2010 | Leme et al. |
| 2010/0088296 A1 | 4/2010 | Periyagaram et al. |
| 2010/0077013 A1 | 5/2010 | Clements et al. |
| 2010/0125553 A1 | 5/2010 | Huang et al. |
| 2010/0125794 A1 | 5/2010 | Hampton et al. |
| 2010/0174881 A1 | 7/2010 | Anglin et al. |
| 2010/0205163 A1 | 8/2010 | Eshghi et al. |
| 2010/0281081 A1 | 11/2010 | Stager et al. |
| 2010/0333116 A1 | 12/2010 | Prahlad et al. |
| 2011/0126099 A1 | 5/2011 | Anderson et al. |
| 2011/0131588 A1 | 6/2011 | Allam et al. |
| 2011/0145473 A1 | 6/2011 | Maheshwari |
| 2011/0161784 A1 | 6/2011 | Selinger et al. |
| 2011/0249147 A1 | 10/2011 | Ishii |
| 2012/0102503 A1 | 4/2012 | Meijer et al. |
| 2012/0109985 A1 | 5/2012 | Chandrasekaran |
| 2012/0151014 A1 | 6/2012 | Gokhale et al. |
| 2012/0198027 A1 | 8/2012 | Hetzler et al. |
| 2012/0259994 A1 | 10/2012 | Gillies et al. |
| 2013/0226931 A1 | 8/2013 | Hazel et al. |
| 2013/0275808 A1 | 10/2013 | McNeeney et al. |
| 2013/0290598 A1 * | 10/2013 | Fiske ................... G06F 3/0625 711/E12.008 |
| 2014/0006465 A1 | 1/2014 | Davis et al. |
| 2014/0089264 A1 | 3/2014 | Talagala et al. |
| 2014/0223115 A1 | 8/2014 | Dinkjian et al. |
| 2014/0270343 A1 | 9/2014 | Sanaullah et al. |
| 2014/0325148 A1 | 10/2014 | Choi et al. |
| 2014/0365719 A1 | 12/2014 | Kuzmin et al. |
| 2015/0169449 A1 | 6/2015 | Barrell et al. |
| 2015/0172120 A1 | 6/2015 | Dwarampudi et al. |
| 2015/0205816 A1 | 7/2015 | Periyagaram et al. |
| 2015/0227602 A1 | 8/2015 | Ramu et al. |
| 2015/0261776 A1 | 9/2015 | Attarde et al. |
| 2015/0341212 A1 | 11/2015 | Hsiao et al. |
| 2015/0355862 A1 | 12/2015 | Hayes et al. |
| 2015/0363245 A1 | 12/2015 | Mutschler |
| 2016/0042008 A1 | 2/2016 | Tripathy et al. |
| 2016/0063080 A1 | 3/2016 | Nano et al. |
| 2016/0210061 A1 | 7/2016 | Soncodi et al. |
| 2016/0246713 A1 | 8/2016 | Choi et al. |
| 2016/0321287 A1 | 11/2016 | Luthra et al. |
| 2016/0337435 A1 | 11/2016 | Nigam et al. |
| 2016/0350324 A1 | 12/2016 | Wang et al. |
| 2016/0357476 A1 | 12/2016 | Chen et al. |
| 2017/0038978 A1 | 2/2017 | Li et al. |
| 2017/0075832 A1 | 3/2017 | Bhimani et al. |
| 2017/0075947 A1 | 3/2017 | Kurilov et al. |
| 2017/0091570 A1 | 3/2017 | Rao et al. |
| 2017/0123655 A1 | 5/2017 | Sinclair et al. |
| 2017/0147494 A1 | 5/2017 | Andre et al. |
| 2017/0177249 A1 | 6/2017 | Kurilov et al. |
| 2017/0177263 A1 | 6/2017 | Das et al. |
| 2017/0177546 A1 | 6/2017 | Heinz et al. |
| 2017/0212891 A1 | 7/2017 | Pundir et al. |
| 2017/0213127 A1 | 7/2017 | Duncan |
| 2017/0255392 A1 | 9/2017 | Nakashima |
| 2017/0289214 A1 | 10/2017 | Cho et al. |
| 2017/0374147 A1 | 12/2017 | McNair et al. |
| 2018/0101842 A1 | 4/2018 | Ventura et al. |
| 2018/0121307 A1 | 5/2018 | Braun et al. |
| 2018/0146018 A1 | 5/2018 | Chang et al. |
| 2018/0176244 A1 | 6/2018 | Gervais et al. |
| 2018/0184138 A1 | 6/2018 | Shaw et al. |
| 2018/0189175 A1 | 6/2018 | Ji et al. |
| 2018/0314727 A1 | 11/2018 | Epstein et al. |
| 2018/0329644 A1 | 11/2018 | Das et al. |
| 2018/0332325 A1 | 11/2018 | Kaitchuck |
| 2018/0332365 A1 | 11/2018 | Kaitchuck et al. |
| 2018/0332366 A1 | 11/2018 | Paduroiu |
| 2018/0332367 A1 | 11/2018 | Kaitchuck et al. |
| 2018/0336256 A1 | 11/2018 | Li et al. |
| 2018/0345140 A1 | 12/2018 | Posin |
| 2019/0004863 A1 | 1/2019 | Mainali et al. |
| 2019/0026301 A1 | 1/2019 | Wang et al. |
| 2019/0046037 A1 | 2/2019 | Ramesh et al. |
| 2019/0057138 A1 | 2/2019 | Knowles et al. |
| 2019/0065246 A1 | 2/2019 | Senapaty et al. |
| 2019/0129806 A1 | 5/2019 | Hsu et al. |
| 2019/0138494 A1 | 5/2019 | Inoue |
| 2019/0197173 A1 | 6/2019 | Tahara et al. |

(56) References Cited

U.S. PATENT DOCUMENTS

| | | | |
|---|---|---|---|
| 2019/0220671 | A1 | 7/2019 | Slipenchuk |
| 2019/0278849 | A1 | 9/2019 | Chandramouli et al. |
| 2019/0327297 | A1 | 10/2019 | Madani |
| 2019/0332318 | A1 | 10/2019 | Gooding et al. |
| 2019/0340180 | A1 | 11/2019 | Barsness et al. |
| 2019/0349422 | A1 | 11/2019 | Dhruvakumar et al. |
| 2019/0392866 | A1 | 12/2019 | Yoon et al. |
| 2020/0034468 | A1 | 1/2020 | Lei et al. |
| 2020/0089420 | A1 | 3/2020 | Sharoni et al. |
| 2020/0174695 | A1 | 6/2020 | Bazarsky et al. |
| 2020/0250172 | A1 | 8/2020 | Busjaeger et al. |
| 2020/0310686 | A1 | 10/2020 | Truong et al. |
| 2020/0320005 | A1 | 10/2020 | Shulman et al. |
| 2020/0344299 | A1 | 10/2020 | Sohail et al. |
| 2020/0394196 | A1 | 12/2020 | Shivanna et al. |
| 2020/0404011 | A1 | 12/2020 | Gervais et al. |
| 2021/0084318 | A1 | 3/2021 | Kuo et al. |
| 2021/0110328 | A1 | 4/2021 | Hsiao et al. |
| 2021/0124746 | A1 | 4/2021 | Klaedtke |
| 2021/0157520 | A1 | 5/2021 | Bavishi et al. |
| 2021/0256029 | A1 | 8/2021 | Danilov et al. |
| 2021/0342296 | A1 | 11/2021 | Danilov et al. |
| 2021/0342354 | A1 | 11/2021 | Danilov et al. |
| 2021/0365211 | A1 | 11/2021 | Danilov et al. |
| 2021/0374021 | A1 | 12/2021 | Santhakumar et al. |
| 2022/0035533 | A1 | 2/2022 | Danilov et al. |
| 2022/0182724 | A1 | 6/2022 | Gupta et al. |
| 2022/0248090 | A1 | 8/2022 | Dhiman et al. |
| 2022/0326878 | A1* | 10/2022 | Paduroiu ............... G06F 3/0659 |

FOREIGN PATENT DOCUMENTS

| | | | |
|---|---|---|---|
| CN | 1708029 | A | 12/2005 |
| CN | 104901958 | B | 9/2015 |
| CN | 105591926 | B | 5/2016 |
| GB | 2377038 | A | 12/2002 |
| WO | 2002101585 | A2 | 12/2002 |
| WO | 2004080067 | A1 | 9/2004 |
| WO | 2009014993 | A2 | 1/2009 |
| WO | 2015191120 | A1 | 12/2015 |
| WO | 2015196281 | A1 | 12/2015 |
| WO | 2018148149 | A1 | 8/2018 |

OTHER PUBLICATIONS

Notice of Allowance received for U.S. Appl. No. 17/976,574, dated Jul. 6, 2023, 41 pages.
Notice of Allowance received for U.S. Appl. No. 17/145,588, dated Aug. 7, 2023, 28 pages.
Non-Final office action received for U.S. Appl. No. 17/152,558 dated Oct. 19, 2023, 66 pages.
Non-Final office action received for U.S. Appl. No. 17/228,611 dated Dec. 11, 2023, 70 pages.
Non-Final office action received for U.S. Appl. No. 17/237,517 dated Nov. 27, 2023, 117 pages.
Notice of Allowance received for U.S. Appl. No. 18/164,744 dated Dec. 28, 2023, 81 pages.
Notice of Allowance received for U.S. Appl. No. 17/145,588, dated Oct. 18, 2023, 6 pages.
Non-Final Office Action received for U.S. Appl. No. 16/881,556 dated Jun. 29, 2021, 24 pages.
Akidau et al., "MillWheel: Fault-Tolerant Stream Processing at Internet Scale" Proceedings of the VLDB Endowment, vol. 6, No. 11, 2013, 12 pages.
Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.
Execution Model [https://beam.apache.org/documentation/runtime/model/]. The Apache Software Foundation. Retrieved Aug. 26, 2020, 5 pages.
Apache Beam Programming Guide [https://beam.apache.org/documentation/programming-guide/]. The Apache Software Foundation. Retrieved Aug. 26, 2020, 69 pages.
What is Apache Flink?—Applications [https://flink.apache.org/flink-applications.html#building-blocks-for-streaming-applications]. The Apache Software Foundation. Copyright 2014-2019, retrieved Aug. 26, 2020, 7 pages.
What is Apache Flink?—Architecture [https://flink.apache.org/flink-architecture.html]. The Apache Software Foundation. Copyright 2014-2019, retrieved Aug. 26, 2020, 3 pages.
Stateful Function—Event-driven Application on Apache Flink [https://flink.apache.org/stateful-functions.html]. The Apache Software Foundation. Copyright 2014-2019, retrieved Aug. 26, 2020, 8 pages.
What is Apache Flink?—Operations [https://flink.apache.org/flink-operations.html]. The Apache Software Foundation. Copyright 2014-2019, retrieved Aug. 26, 2020, 3 pages.
Use Cases [https://flink.apache.org/usecases.html]. The Apache Software Foundation. Copyright 2014-2019, retrieved Aug. 26, 2020, 5 pages.
Introduction [http://kafka.apache.org/intro]. The Apache Software Foundation. Copyright 2017, retrieved Aug. 26, 2020, 6 pages.
Apache Kafka Quickstart [http://kafka.apache.org/quickstart]. The Apache Software Foundation. Copyright 2017, retrieved Aug. 26, 2020, 6 pages.
Use Cases [http://kafka.apache.org/uses]. The Apache Software Foundation. Retrieved Aug. 26, 2020, 3 pages.
Architecture Overview [pulsar.apache.org/docs/en/concepts-architecture-overview/]. The Apache Software Foundation. Copyright 2020, retrieved Aug. 26, 2020, 11 pages.
Messaging [pulsar.apache.org/docs/en/concepts-messaging/]. The Apache Software Foundation. Copyright 2020, retrieved Aug. 26, 2020, 32 pages.
Pulsar Overview [pulsar.apache.org/docs/en/concepts-overview/]. The Apache Software Foundation. Copyright 2020, retrieved Aug. 26, 2020, 2 pages.
Non-Final Office Action received for U.S. Appl. No. 16/256,083, dated Jan. 29, 2021, 42 pages.
Notice of Allowance received for U.S. Appl. No. 16/884,647, dated Jun. 28, 2021, 39 pages.
Notice of Allowance received for U.S. Appl. No. 17/200,652, dated Jun. 28, 2021, 51 pages.
Non-Final Office Action received for U.S. Appl. No. 17/127,724, dated Oct. 1, 2021, 41 pages.
Notice of Allowance received for U.S. Appl. No. 17/064,747, dated Dec. 15, 2021, 61 pages.
Non-Final Office Action received for U.S. Appl. No. 16/944,089, dated Nov. 10, 2021, 257 pages.
Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.
Notice of Allowance received for U.S. Appl. No. 16/915,762, dated Feb. 4, 2022, 57 pages.
Non-Final Office Action received for U.S. Appl. No. 16/915,762, dated Oct. 1, 2021, 57 pages.
Non-Final Office Action received for U.S. Appl. No. 16/864,892, dated Jan. 21, 2022, 26 pages.
Notice of Allowance received for U.S. Appl. No. 17/038,079, dated Feb. 24, 2022, 143 pages.
Azhar et al., "Efficient selection of access control systems through multi criteria analytical hierarchy process", IEEE, doi: 10.1109/ICET.2012.6375419, 2012, pp. 1-8. (Year: 2012).
Rox et al., "Construction and Deconstruction of Hierarchical Event Streams with Multiple Hierarchical Layers", IEEE, doi: 10.1109/ECRTS.2008.13, 2008, pp. 201-210. (Year: 2008).
Notice of Allowance received for U.S. Appl. No. 17/083,145, dated Feb. 18, 2022, 253 pages.
Non-Final Office Action received for U.S. Appl. No. 16/864,905, dated Mar. 21, 2022, 441 pages.
Edi Muskardin et al., "Implementation of Hashing Algorithms in Stream Mining", International Conference on Smart Systems and Technologies (SST), Oct. 2018, pp. 233-238.

(56) References Cited

OTHER PUBLICATIONS

Notice of Allowance mailed Apr. 11, 2022 for U.S. Appl. No. 16/944,089, 87 pages.
J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).
T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).
Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).
M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).
Non-Final Office Action received for U.S. Appl. No. 16/944,094, dated Apr. 20, 2022, 48 pages.
Non-Final Office Action received for U.S. Appl. No. 17/038,102, dated Apr. 12, 2022, 52 pages.
Notice of Allowance received for U.S. Appl. No. 17/127,724, dated Apr. 27, 2022, 19 pages.
Non-Final Office Action received for U.S. Appl. No. 17/237,535, dated May 24, 2022, 62 pages.
Final Office Action received for U.S. Appl. No. 16/864,892, dated Jul. 8, 2022, 33 pages.
Final Office Action received for U.S. Appl. No. 16/864,905, dated Jul. 15, 2022, 77 pages.
Final Office Action received for U.S. Appl. No. 16/944,094, dated Sep. 1, 2022, 25 pages.
Non-Final Office Action received for U.S. Appl. No. 17/070,029, dated Jul. 21, 2022, 68 pages.
Notice of Allowance received for U.S. Appl. No. 17/152,544, dated Aug. 24, 2022, 55 pages.
Non-Final Office Action received for U.S. Appl. No. 17/383,425, dated Sep. 15, 2022, 88 pages.
Phaujdar, "Understanding Event Streams—A Comprehensive Guide 101_ Learn Hevo" [https://hevodata.com/learn/understanding-event-streams/] (Feb. 17, 2021) (Year: 2021).
Dhanushka, "Understanding Kafka Topic Partitions" [https://medium.com/event-driven-utopia/understanding-kafka-topic-partitions-ae40f80552e8]—(Mar. 28, 2021) (Year: 2021).
Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).
Non-Final Office Action received for U.S. Appl. No. 17/408,344, dated Sep. 30, 2022, 66 pages.
Non-Final Office Action received for U.S. Appl. No. 17/063,906, dated Oct. 27, 2022, 59 pages.
Notice of Allowance received for U.S. Appl. No. 16/864,905, dated Nov. 30, 2022, 347 pages.
Tony Tung et al., "Topology Dictionary for 3D Video Understanding", IEEE Transactions on Pattern Analysis and Machine Intelligence ( vol. 34, Issue: 8, Aug. 2012), Dec. 2011, pp. 1645-1657.
A. Bulut et al., "Distributed data streams indexing using content-based routing paradigm", 19th IEEE International Parallel and Distributed Processing Symposium, Apr. 2005, pp. 1-10.
Notice of Allowance received for U.S. Appl. No. 17/070,029, dated Dec. 2, 2022, 36 pages.
Non-Final Office Action received for U.S. Appl. No. 17/223,263, dated Nov. 28, 2022, 64 pages.
Non-Final Office Action received for U.S. Appl. No. 17/152,558, dated Dec. 7, 2022, 59 pages.
Non-Final Office Action received for U.S. Appl. No. 17/337,940, dated Dec. 30, 2022, 68 pages.
Notice of Allowance received for U.S. Appl. No. 17/063,906, dated Feb. 6, 2023, 29 pages.
Notice of Allowance received for U.S. Appl. No. 17/383,425, dated Feb. 1, 2023, 37 pages.
Notice of Allowance dated Nov. 15, 2022 for U.S. Appl. No. 16/864,892, 48 pages.
Notice of Allowance dated Nov. 23, 2022 for U.S. Appl. No. 17/408,344, 35 pages.
Notice of Allowance dated Nov. 17, 2022 for U.S. Appl. No. 16/944,094, 23 pages.
Office Action dated Feb. 10, 2023 for U.S. Appl. No. 17/145,588, 78 pages.
Non Final Office Action received for U.S. Appl. No. 17/976,574 dated Mar. 2, 2023, 55 pages.
Notice of Allowance received for U.S. Appl. No. 17/337,940 dated Mar. 1, 2023, 70 pages.
Notice of Allowance received for U.S. Appl. No. 17/223,263, dated Apr. 6, 2023, 32 pages.
Office Action mailed May 12, 2023 for U.S. Appl. No. 17/152,558, 51 pages.
Notice of Allowance for U.S. Appl. No. 17/237,517 dated Feb. 28, 2024, 91 pages.

* cited by examiner

DEMOTED DATA RETENTION VIA A TIERED ORDERED EVENT STREAM DATA STORAGE SYSTEM

BACKGROUND

Data storage via an ordered event stream (OES) data storage system can provide numerous benefits. Stored data can be affiliated with a retention period. Management of an OES can be affiliated with pruning a stream via a stream cut operation. Moreover, stored data of an OES can be stored via a plurality of storage device tiers, e.g., hot data storage and cold data storage tiers, etc. Data can be moved between storage device tiers, e.g., as data cools, the data can be moved from a hot data tier to a cooler data tier of storage devices, etc. Control of data retention for data stored in a tiered OES data storage system is desirable.

FIG. is an illustration of an example embodiment that can support control of data retention for a spatially distributed tiered ordered event stream data storage system.

Figure 4:
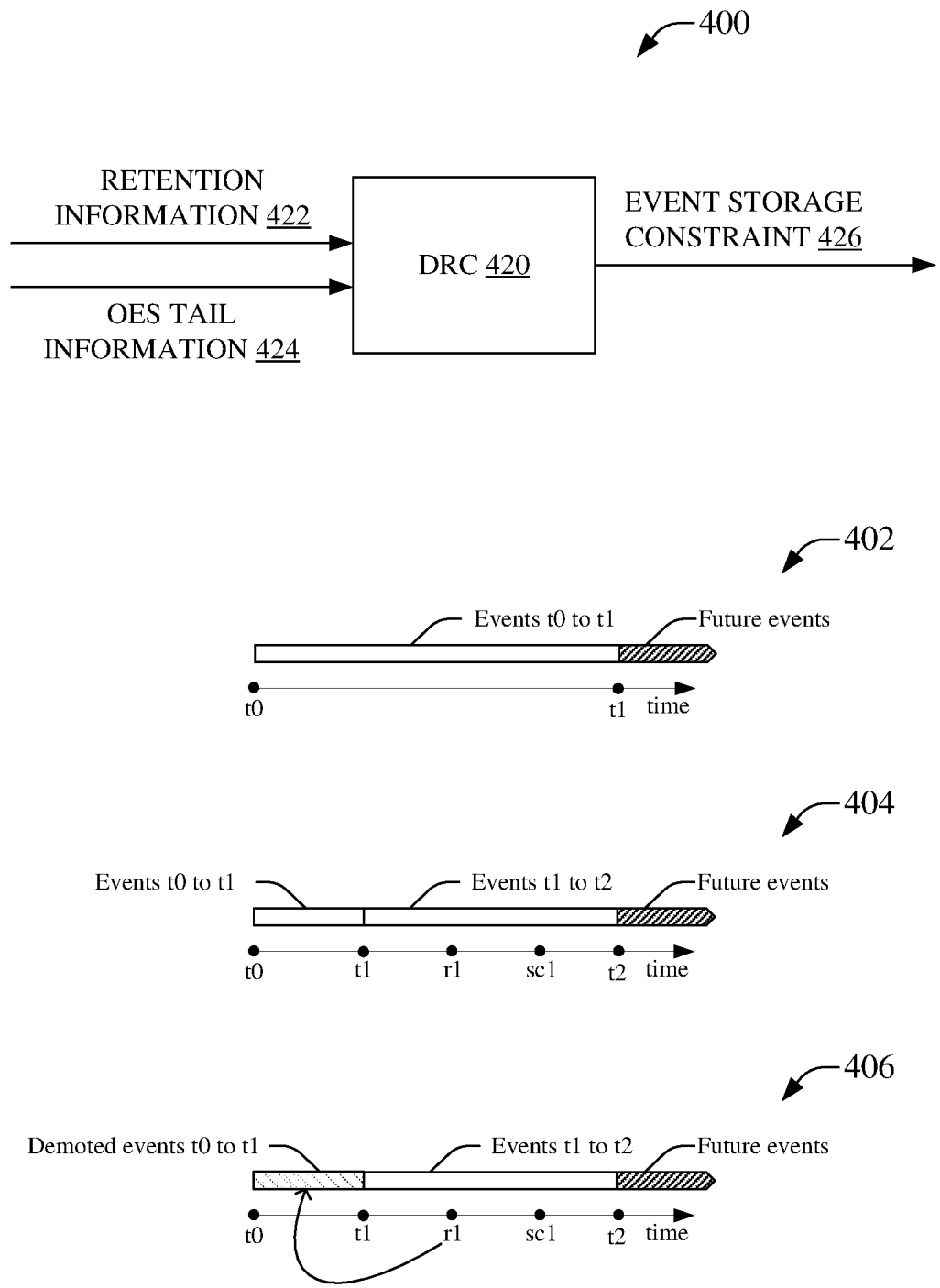

FIG. 4 is an illustration of an example embodiment that can enable demoted data retention via a tiered ordered event stream data storage system.

Figure 5:
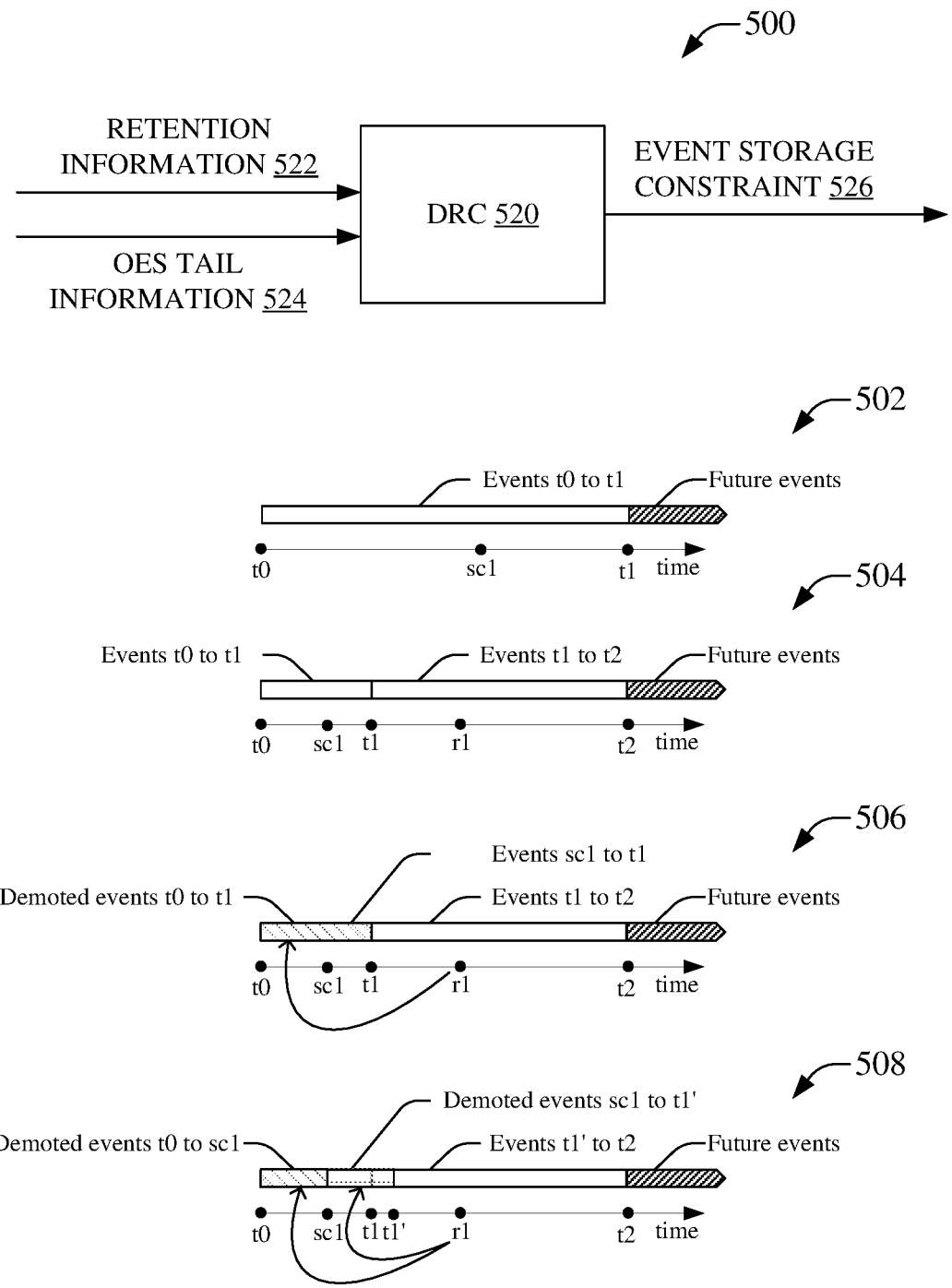

FIG. 5 is an illustration of an example embodiment that can facilitate demoted data retention accommodating an intervening stream cut instance of a tiered ordered event stream data storage system.

Figure 6:
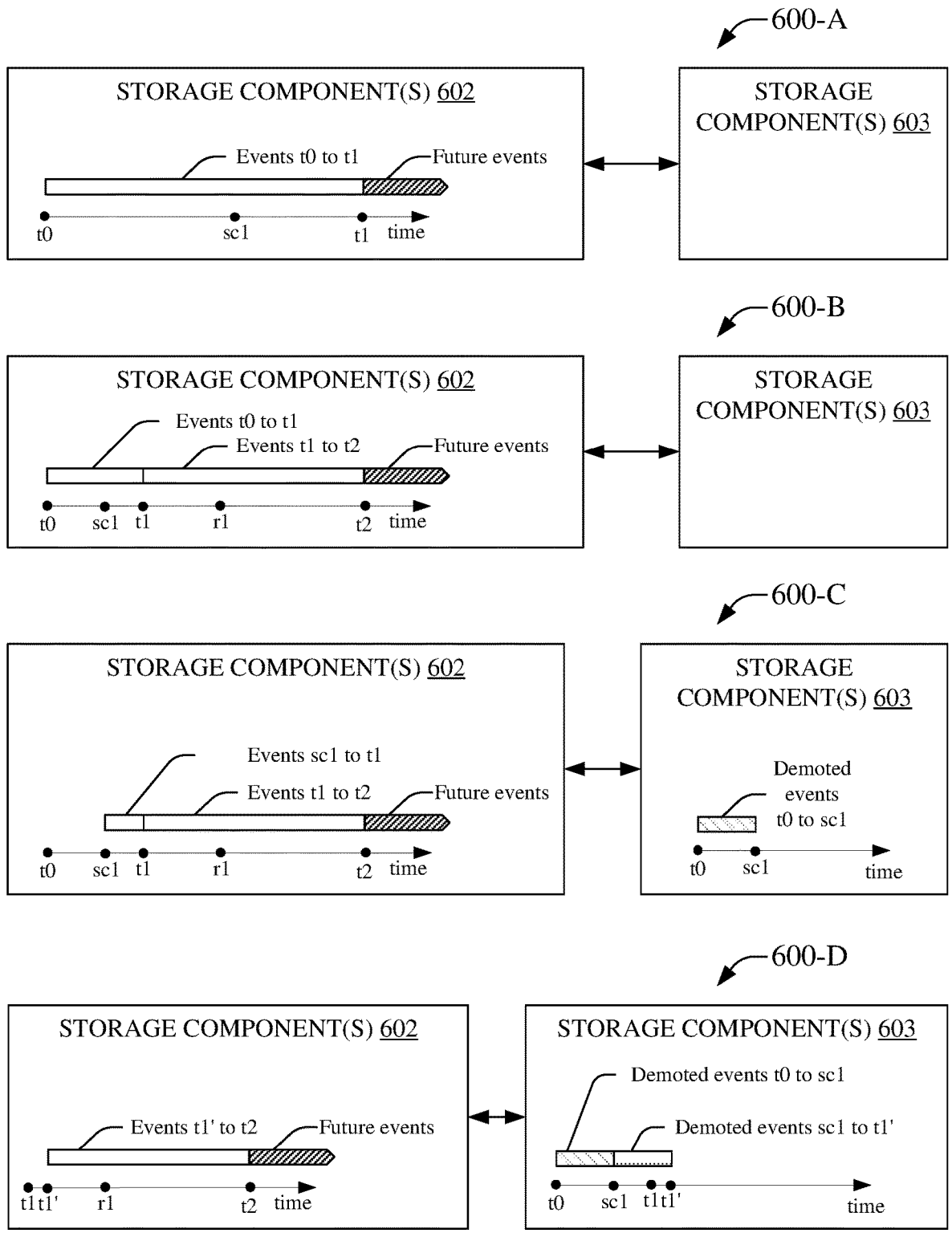

FIG. 6 is an illustration of an example embodiment that can facilitate demoted data retention accommodating an intervening stream cut instance via different tiers of a tiered ordered event stream data storage system.

Figure 7:
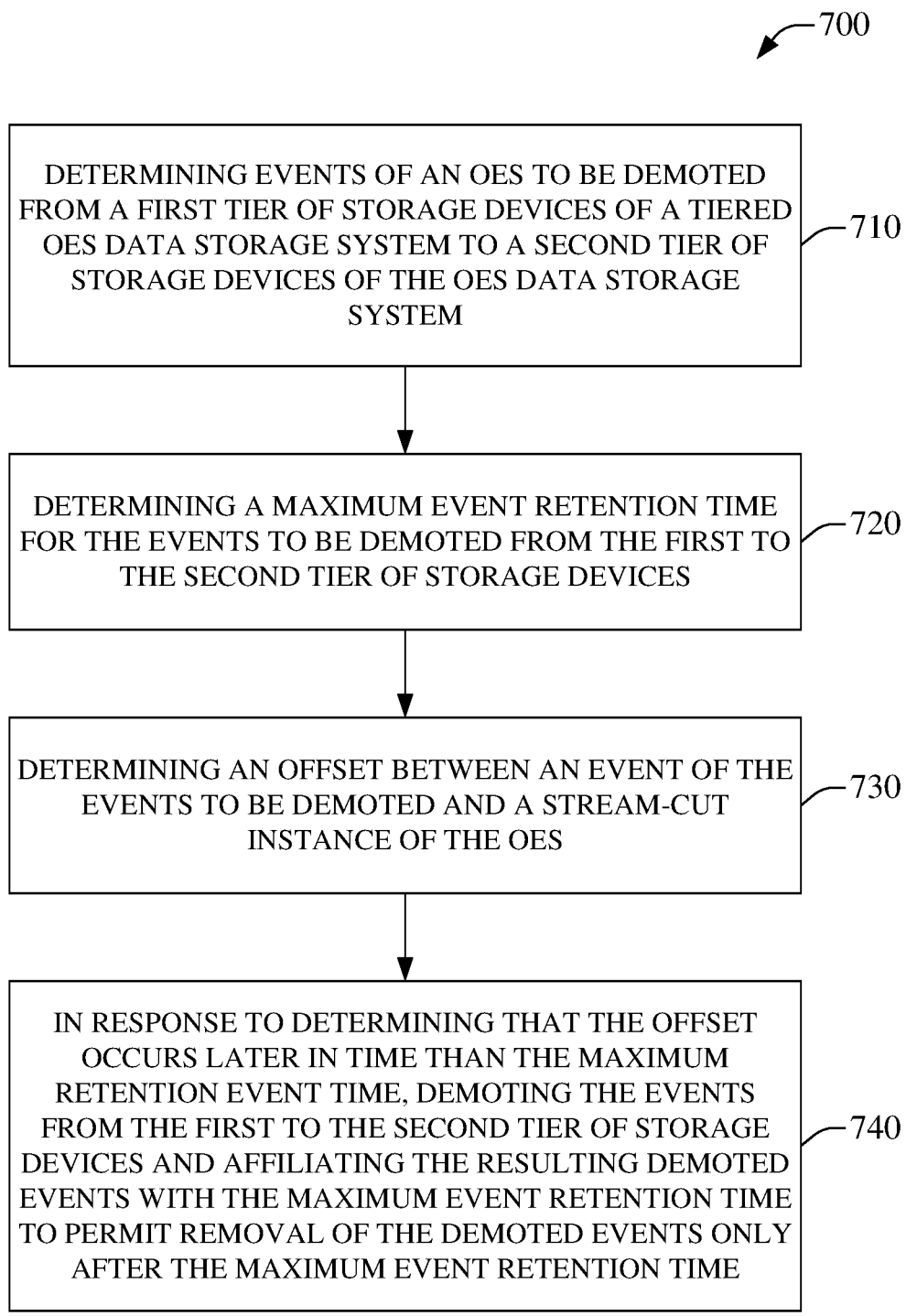

FIG. 7 is an illustration of an example embodiment facilitating control of data retention for a tiered ordered event stream data storage system.

Figure 8:
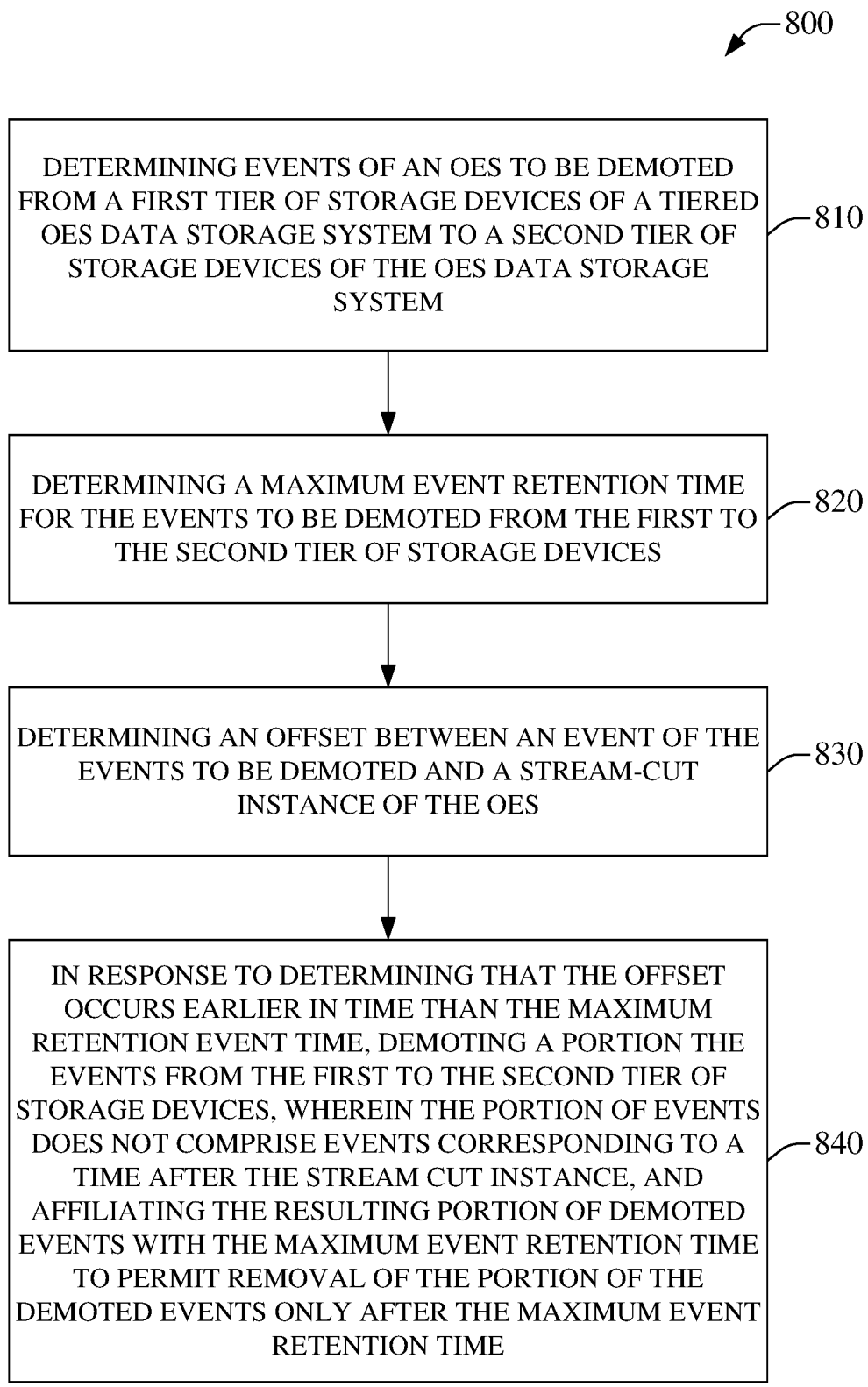

FIG. 8 is an illustration of one example embodiment facilitating control of data retention accommodating an intervening stream cut instance for a tiered ordered event stream data storage system.

Figure 9:
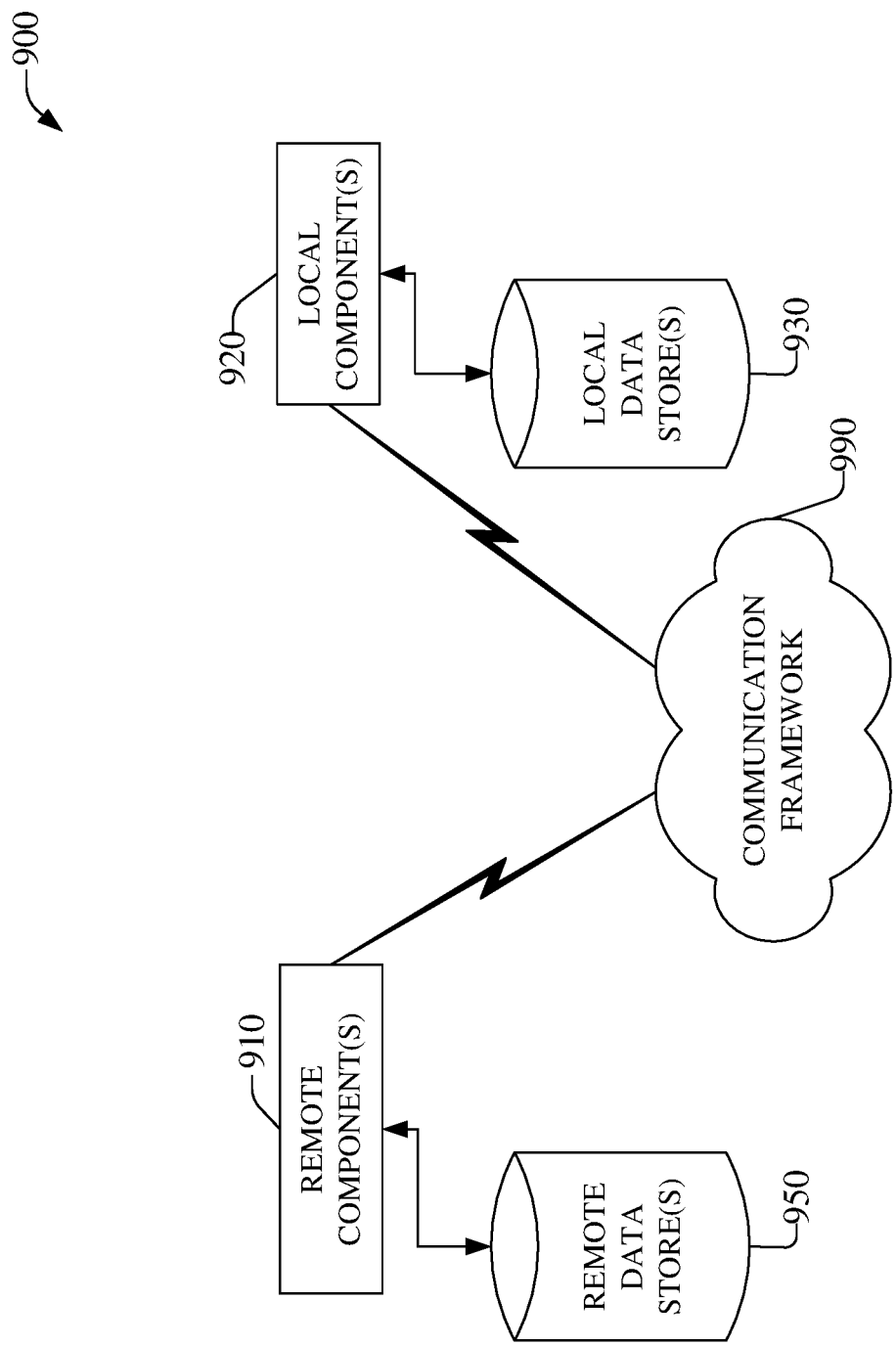

FIG. 9 depicts an example schematic block diagram of a computing environment with which an embodiment of the disclosed subject matter can interact.

Figure 10:
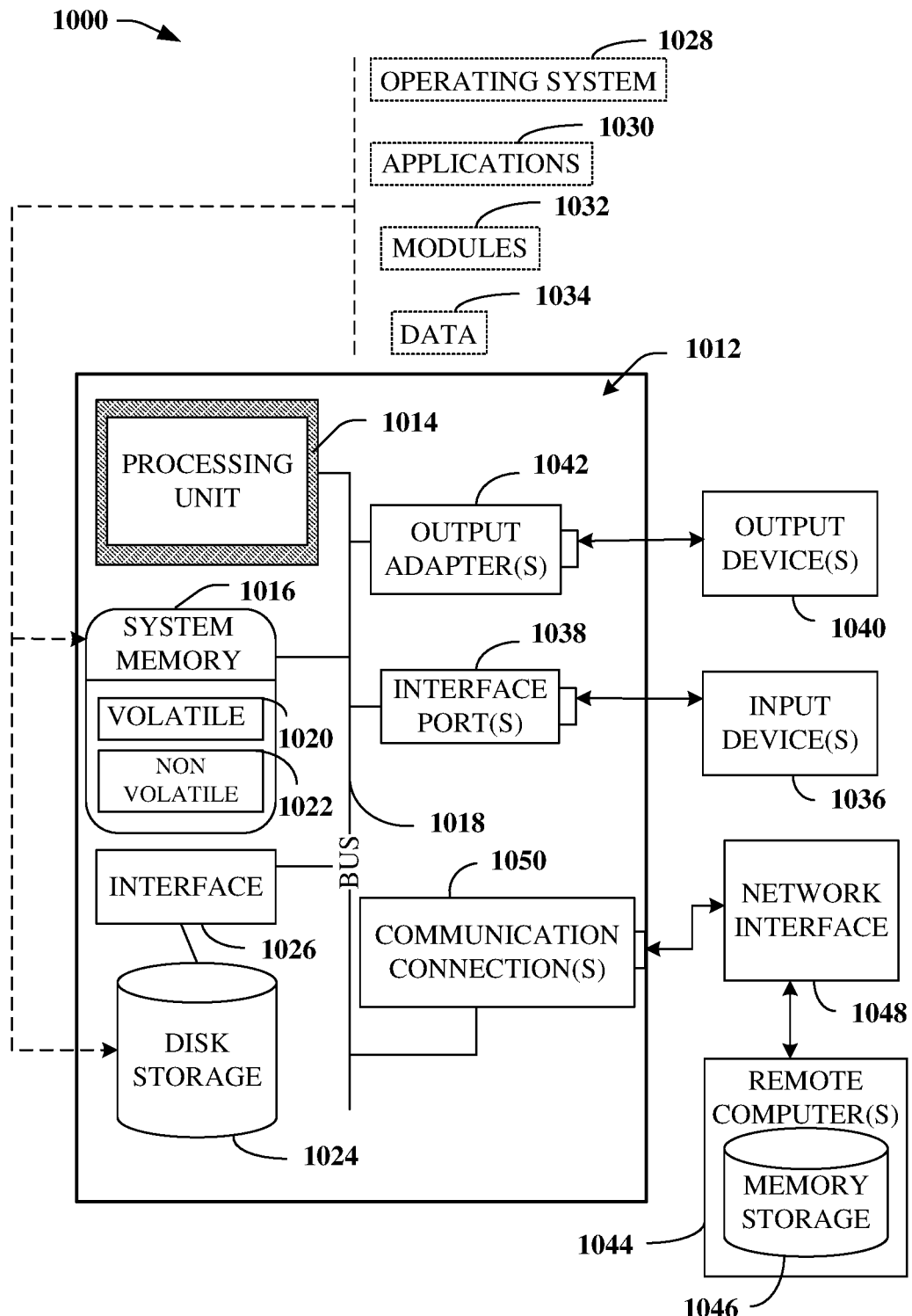

FIG. 10 illustrates an example block diagram of a computing system operable to execute the disclosed systems and methods in accordance with an embodiment.

DETAILED DESCRIPTION

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter relates to data storage via an ordered event stream (OES) data storage system can provide numerous benefits. Data stored via an OES can be affiliated with a retention period. Management of an OES can be affiliated with pruning a stream via one or more stream-cut operations, hereinafter 'cuts' or 'stream cuts'. Moreover, an OES can support data storage via a plurality of storage device tiers, for example to improve economic efficiency, etc., wherein data can be moved between storage device tiers. When data is moved between storage device tiers, hereinafter 'tiers', propagation of data retention control can be problematic, more especially where OES pruning, such as via steam cuts, is to be supported across tiers.

Generally, an ordered event stream (OES) can be a durable, elastic, append-only, and potentially unbounded, sequence of events. An event can be added to a head of a stream of events, e.g., a first event can be considered as residing at a tail of the event stream and a most recent event can be regarded as residing at the head of the stream with other events ordered between the tail and the head of the stream. The events need not be stored in contiguous storage locations to be logically sequenced in the stream representation, e.g., a first event can be stored on a first disk, a second event on a remotely located second disk, and a third event stored at a further remote third disk, the stream can logically sequence the first, second, and third events by reference to their stored data in different physical locations, the ordered event stream (OES) can be regarded as an abstraction enabling ordering of the events comprised in the stored data, e.g., the stored events can be regarded as being ordered according to the OES, thereby enabling writing, reading, or other event operations, to occur according to the ordering of the events. It is noted that some stream storage systems can employ an alternative head/tail terminology, for example, a first event can be added at a head of an OES, while subsequent new events can then be added sequentially to a tail of the OES, however, this is indistinguishable in all other ways from the head/tail convention generally employed in the instant disclosure, e.g., an event is still part of a sequence of events and corresponds to a key as disclosed elsewhere herein.

Every event of a stream can be associated with a routing key, or simply key for convenience, typically a hashed routing key. A key can often be derived from data of the event, e.g., a "machine-id," "location," "device type," "customer number," "vehicle identifier," etc., corresponding to the information of the event. In one or more embodiments, an event can be associated with a key, however, data yet to be written to an event can be associated with an access target value that can be the same value as the key, e.g., the access target value can be determined based on the data of the event, a characteristic corresponding to the event to be recorded, etc., such that the access target value can be regarded to be the same as the key. Accordingly, the term event key, hashed key value, access target value, key, etc., can be used interchangeably for convenience unless the context indicates a more specific use, for example, an access target value can correspond to data to be stored in an event and can be derived from data or other characteristics corresponding to the data, such that when the event is stored, the access target value can be used as the key associated with storing the event. Similarly, in a read operation, an access target value can be indicated to allow access to an event having a key that matches the access target value because the event was written to the OES according to a key that can be the same as the access target value. Generally speaking, the term access target value can relate to a 'key's value,' such that access to events of an OES can be based on comparing the access target value to key values for actual stored events, where an existing event is to be read, or key values that will be used to store an event, where an event will be written into the OES at the access target value. Again, it is generally easier to just use the term key for both access target value and routing key, unless more specificity is needed in an example, and this convention is generally used in the instant disclosure for simplicity and brevity. Events with the same routing key can be written to a corresponding stream or stream segment, and can also be consumed, e.g., read, in the order they were written to the stream or stream segment.

A stream can be comprised of a group of portions, e.g., shards, partitions, pieces, etc., that can generally be referred to as stream segments, or simply 'segment(s)' for convenience. The segments can act as logical containers for one or more events within a stream, e.g., it is understood that events written to geographically disparate data storage devices can logically be written to the same stream segment, e.g., same logical container. When a new event is written to a stream, it can be stored to a segment of the stream based on a corresponding key. As such, the key space can be employed to divide the stream into a number of parts, e.g., segments. In typical embodiments, consistent hashing can be employed to assign events to appropriate segments. As an example, where a stream comprises only one segment, all events to be written to the stream are written to the same segment in an ordered manner and the segment corresponds to the entire key space. As another example, where a stream comprises two parallel segments, the key space of the event, e.g., from zero to 'n', can be associated with the two segments, however each of the two segments can be associated with a portion of the total key space, for example, the first segment can store events of time t with a key between zero and 'm' and the second segment can store other events of time t with a key between 'm+1' and 'n'. It will be appreciated that more segments can serve to further divide the key space such that a segment can store an event with a key falling within the range of the key space associated with that segment. As an example, a four-segment event stream can have each segment store data at time t for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0.

In one or more embodiments, a segment of an event stream can typically be associated with a single processing instance, e.g., one processor, one cooperating group of processors, etc., to assure ordering of the events stored in the segment. A processing instance can be a single real physical processor, a virtualized processor instance executing on one or more real physical processors, a group of real physical processors, a group of virtual processor instances executing on one or more real physical processors, etc. As an example, a processing instance can be embodied via a blade server in a computing facility. As another example, a processing instance can be a virtual processor deployed in an elastic computing system, e.g., a 'cloud server,' etc. Typically, a processing instance can be associated with a level of performance which, in some embodiments, can be measured via one or more key performance indicators (KPIs) for the processing instance. As an example, a first blade server can have a first level of performance and a second blade server can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance.

Generally, the computing resources of a processing instance can be associated with costs, e.g., monetary costs, electrical consumption costs, dispersion of generated heat costs, support costs, real estate for deployment costs, operations per unit time as a cost, etc. As such, selecting an appropriate processing instance can be associated with optimizing cost. As an example, if an event stream typically consumes less than one unit of work, then pairing the stream with a processing instance that can perform one unit of work can be deemed a better use of computing resources, e.g., lower overall aggregate costs, etc., than pairing the even stream with a processing instance that can perform 200 units of work which can result in wasting up to 199 units of work through underutilization. Moreover, in this example, the 200-unit processing instance, for example, can be a newer high end processing instance that can have a high monetary cost, and generate more heat than the one-unit processing instance that, for example, can be a low-cost commodity processing instance that is plentiful, has a low monetary cost, and is already widely deployed. As such, paring the one unit of work event stream with a racecar of a performance instance can be understood as possibly not being an optimal pairing in comparison to a more pedestrian performance instance.

In various embodiments, scaling technology employed in a stream data storage system can be beneficial, e.g., scaling an OES to comprise one or more segments can improve use of computing resources in contrast to a conventional unscaled stream data storage system. In one or more example embodiments, a portion of a stream, e.g., an OES or portion thereof, can be divided evenly to distribute the work corresponding to event operations, e.g., splitting a stream in to two subsequent similar portions can, for example, enable use of two processors in parallel rather than one processor. This can be regarded as a form of 'symmetrical scaling' of an event stream. Alternatively, a stream can be split into dissimilar portions, regarded as a form of 'asymmetrical scaling,' that can result in portions that are dissimilar, e.g., one resulting segment can correspond to a greater or lesser key space than a second resulting segment, etc. In some embodiments, symmetric and asymmetric scaling can be performed on one portion of an OES and can result in two or more subsequent other portions of the OES, for example, symmetrical scaling of a stream into three or more similar portions, etc. In one or more embodiments, these other portions can also comprise a mix of symmetric and asymmetric splits of the stream, for example, a first portion of a stream can be split into a second, third, and fourth portion, wherein the second and third can be similar, e.g., symmetric, and the fourth portion can be dissimilar from the second or third portion, e.g., asymmetric. In this example, the scaling can be referred to as 'mixed scaling,' e.g., implying that the subsequent portions of the stream after scaling can comprise a mix of symmetric and asymmetric portions, see the example evolutionary changes to segments of an example OES illustrated in FIG. 2.

Scaling of the event stream can be in response to a threshold consumption of computing resources, e.g., when a threshold work level is traversed, an event stream can be scaled. In one or more embodiments, scaling can generally be associated with allocating computing operations to logical portions of an ordered stream of events. As an illustrative example, first processor(s) can satisfactorily write 5000 events per unit time to an ordered event stream, e.g., into storage corresponding to the ordered event stream, however, where the rate of events to be written to the stream, for example, doubles to 10000 events per unit time, the first processor(s) can be determined to be underperforming due to being overly burdened and it can be desirable to scale the OES to compensate for overburdening of the first processor(s). As such, scaling can add second processor(s) such that the load on the first, and now the second, processors can be similar, e.g., the writing of the example 10000 events per unit time can be managed by two or more processor after the scaling rather than just the first processor(s) before the scaling of the OES. As noted elsewhere herein, the scaling can be symmetric, asymmetric, or mixed scaling. It can be further noted that symmetric scaling of a key space can result in non-symmetric loading of a computing resource(s). As an expansion of a previous example, where a first processor(s) writes 5000 events per unit time to event keys between 0 and 0.5 of a key space, and this load doubles as a result of an additional 5000 writes with an event key between 0 and 0.1 of the key space, then scaling the OES by symmetrically dividing the key space between the first processor(s) from 0 to 0.25 and the second processor(s) from 0.25 to 0.5 of the key space should not result in a symmetric division of computer resource loading, e.g., the first processor(s) would now address a portion of the initial 5000 events and an additional burden from the 5000 events between 0 and 0.1 of the key space, while the second processor(s) would address the initial 5000 events less the portion still being managed by the first processor(s), but would not get any part of the additional 5000 events. As such, mere equal key space division of a portion of an OES that is ignorant of the distribution of work across the key space of the event stream can be less effective that might otherwise be imagined. Improved scaling technologies can be considerate of a resulting workload and can, for example, accommodate asymmetric scaling of a portion of an OES based on a key space characteristic(s), such that resulting workloads can be distributed to available computing resources in a more tailored manner, e.g., a scaling vent can have asymmetric key space scaling that can result in symmetric computing resource use, etc. Moreover, advanced scaling techniques can perform scaling intelligently, e.g., based on indications received from a user, administrator, analytics component, optimization engine, etc., to selectively burden a portion(s) of available computing resources according to a performance, capability, metric, etc., of an individual portion(s) of the available resources, e.g., adding an additional mid-range processor can result in a different scaling than adding another high-end processor. Optionally, scaling can also be selectively deferred, wherein the deferral can reduce consumption of computing resources, e.g., committing a scaling event can consume computing resources so it can be desirable to scale in response to determining that the scaling would beneficial over and above any use of computing resources to commit the scaling event itself.

Given that an OES can be large, e.g., as previously noted an OES can be an unbounded series of events, storage of OES data can be an important consideration. The use of tiered data storage devices can provide improvements in storage cost efficiency. As an example, more frequently accessed events can be stored via a first storage device tier that favors fast access, while less frequently accessed events can be stored via a second storage device tier that favors low-cost data storage. As another example, newest events can be stored via volatile storage devices, e.g., random-access memory, etc., then can be moved to a fast-access-speed storage device, e.g., solid-state-drives (SSDs), etc., and can then be moved after aging for storage via non-volatile storage devices, e.g., hard drives, tape drives, etc. Numerous other examples of the beneficial use of tiered data storage can readily be appreciated, and all such tiered storage device examples are to be considered within the scope of the instant disclosure even where they are not explicitly recited for the sake of clarity and brevity.

In embodiments, data can be actively retained, e.g., deletion of data can be actively prohibited, based on one or more retention policies. Accordingly, the retention policies should apply across storage device tiers supporting an OES. Moreover, the retention policies and multi-tier storage topology can be complicated by stream cuts that can be implemented to support OES pruning operations, etc. As an example, moving events from a first tier to a second tier can be accommodated by chunking data, e.g., placing multiple events into a chunk object that can be stored via a chunk storage system. As such, event retention times can be used to compute a chunk retention time, e.g., the retention time of a proposed chunk can be restricted from being less than a retention time of any event of the proposed chunk. Moreover, the proposed chunk can be anticipated as comprising events both before and after a stream cut. As such, the proposed chunk can be restricted from having a retention time that is greater than the stream cut. This can permit the chunk to be deleted when both the retention time of all comprised events has elapsed and up to the stream cut instance.

It can be appreciated that if the proposed chunk of the above example did comprise events occurring after the stream cut instance, then the chunk could not be deleted without violating those chunks retention policies. While it is possible to delete 'part of a chunk,' e.g., up to the stream cut, this can be complicated to track, would typically be storage space inefficient due to maintaining underfilled chunks, increases storage demands by needing to store chunks states, etc., and is therefore generally disfavored. Accordingly, moving events into a chunk, file, etc., of another tier of storage can be performed in accord with event retention times and stream cut instances at creation of the chunk, file, etc., to enable deletion of an entire chunk rather than deleting parts of a chunk, e.g., a proposed chunk can be based on both retention and cuts. Moreover, an event storage constraint can then be directly affiliated with a proposed chunk, wherein the event storage constraint can be determined from a retention policy and OES tail information corresponding to one or more stream cuts across one or more segments of an OES in a tiered OES data storage system. As such, control of data retention for a tiered ordered event stream data can be enabled.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

Figure 1:
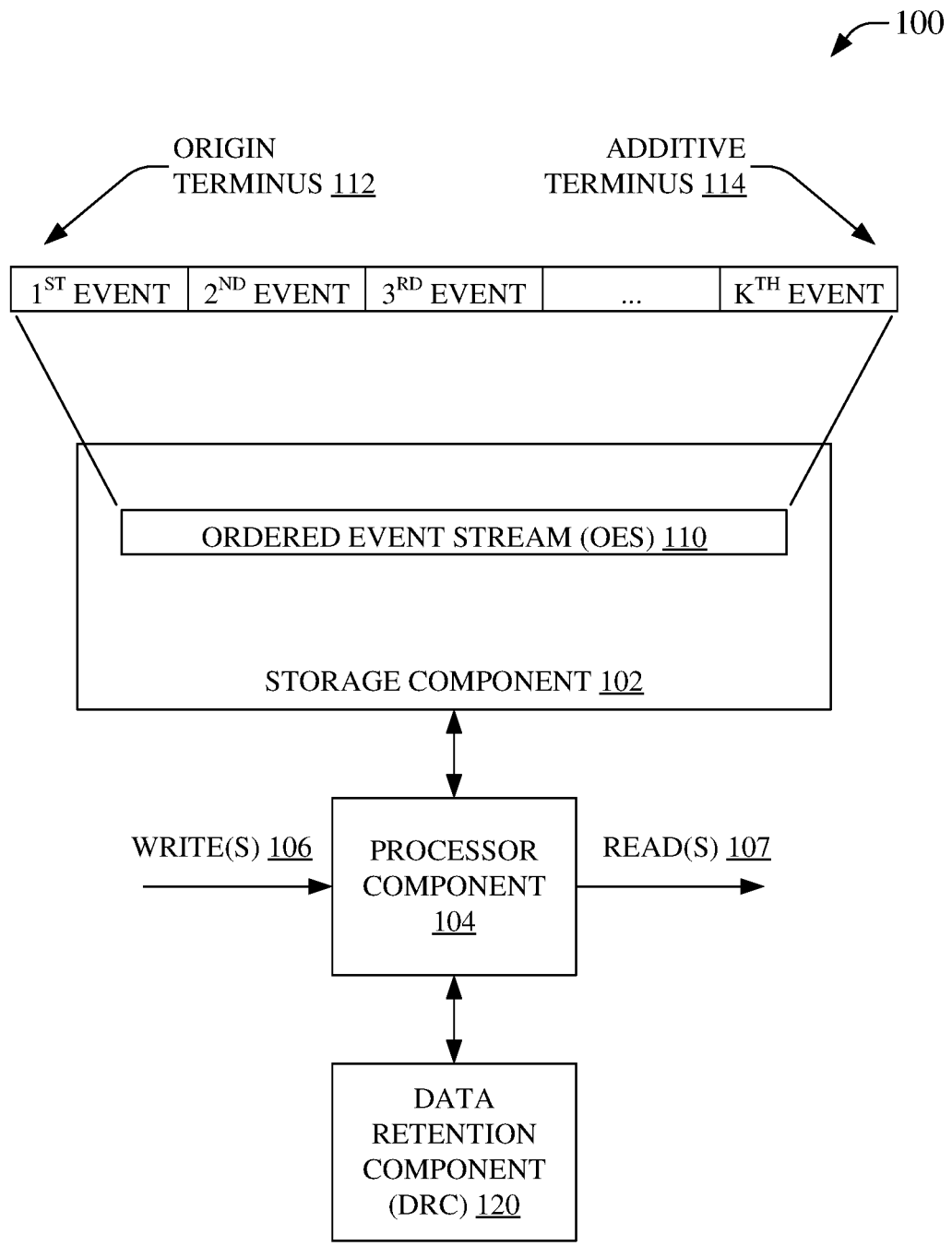
FIG. 1 is an illustration of an example embodiment that can facilitate control of data retention for a tiered ordered event stream (OES) data storage system.

FIG. 1 is an illustration of a system 100, which can facilitate control of data retention for a tiered ordered event stream (OES) data storage system, in accordance with one or more embodiments of the subject disclosure. System 100 can comprise a storage component 102 that can store one or more OESs, e.g., OES 110, etc. Generally, OES 110 can store one or more events. An event is associated with a key, e.g., a routing key. A key can typically be determined from data aspects or data characteristics of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110 in an ordered manner according to the key. As an example, a rideshare company can write events corresponding to rides offered in a first geographic region into a first portion of a key space and other events corresponding to rides offered in a second geographic region into a second portion of the key space. Similarly, events with a same key can be read from OES 110 in an ordered manner, e.g., in the order they were previously written into OES 110. Components providing events to be written can be termed 'writers' and components requesting events can be termed 'readers.' As such, a writer can provide an event that can be written to OES 110 in an ordered manner based on a key associated with the event. Similarly, a reader can receive an event from OES 110 based on a key.

Processor component 104 of a system 100 can receive write(s) 106 that can be written to OES 110 stored on storage component 102. Processor component 104 of a system 100 can provide access to events of OES 110 based on a key, e.g., as read(s) 107 that can be communicated to a reader. Generally, one processing instance, e.g., processor component 104, etc., is designated for writing events to a portion, e.g., segment, of OES 110. OES 110 can comprise one segment and/or parallel segments, e.g., stream segments, etc., that can store events according to a key. In an example embodiment, more than one processing instance writing to a segment of an OES can typically be disfavored because it can increase the difficulty of writing incoming events in an ordered manner. However, a given processing instance can read/write to more than one OES segment, e.g., a given processing instance can write to one or more OESs, to one or more segments of one OES, to one or more segments of one or more OESs, etc. In an example embodiment, while more than one processing instance writing to a segment of an OES is typically disfavored, more than one processing instance reading from a segment can be fully supported, encouraged, etc. As such, for a given number of segments, in some embodiments, there can be up to the same number of processing instances, e.g., to limit more than one processor instance writing to a segment. Although adding more processing instances can be allowable, for example to increase read operations, these additional processing instances can be constrained to read operations to limit the possibility of scrambling an order of events being written to a segment. It is further noted that system 100 can comprise idle processing instances that are not reading or writing to the OES, for example, as reserve processing instances supporting failover operations protecting against an active processing instance becoming less responsive, in support of scaling events, etc. In one or more embodiments, keys of one or more segments of an OES can represent a key space for OES 110. Segments can therefore act as logical containers associated with a particular range of keys for a portion of an event stream and can be used to store events of OES 110. When a new event is written to a stream, it can be logically stored to a segment based on the event key regardless of where it is physically stored. In an example embodiment, the key space can be divided into a number of ranges that can correspond to the number of segments comprising an OES, e.g., OES 110. As an example, a key space for an OES can be from 0 to 100, the OES can comprise two parallel segments wherein the first segment can sequentially store events with, for example, keys from 0 to 30, and the second segment can sequentially store events with keys from >30 to 100. In this example, a first event with a key of 54 can be appended to the second segment, a second event with a key of 29 can be appended to the first segment, a third event with a key of 14 can be further appended to the first segment after the second event, etc. In an example embodiment, storage component 102 can store one or more OESs, although only OES 110 is illustrated for clarity and brevity.

OES 110, as illustrated in system 100, can be an overly simplistic example of an OES that can comprise just one segment for storing incoming event write(s) 106 and sourcing event read(s) 107, and therefore the key space of OES 110 can be embodied in the illustrated single segment of events, e.g., the key space of OES 110 is not illustrated as being distributed across more than one parallel event storage segment. OES 110 can have an origin terminus 112. Whereas the reader of this document is expected to understand that the OES represents a logical ordering of events actually stored on physical storage devices, the instant disclosure will generally simply refer to logically writing to an OES as writing to an OES for the sake of brevity. A first event can be written at origin terminus 112. The subsequent events can then be appended at an additive terminus 114 that is typically always at the head of the stream of written ordered events, e.g., a most recent event is written to the head of OES 110, which provides ordering of the events being written. This results in OES 110 allowing for continuous and unbounded data storage that can be a durable, elastic, append-only, unbounded sequence of events, e.g., an OES can logically represent events stored at any number of physical storage locations, e.g., spanning files, spanning disks, spanning data centers, etc. In an example, a $(K+1)^{th}$ event can be appended to the $K^{th}$ event of OES 110 at additive terminus 114. In an embodiment, storage component 102 can store any number of OESs. Moreover, any one OES can comprise any number of parallel segments, e.g., stings of events for a defined key space range. Each segment can comprise an ordered sequence of stored events.

In system 100, data retention component (DRC) 120 can facilitate migrating data between tiers of data storage devices of an ordered event steam data storage system. In embodiments, different tiers of data storage devices can offer different data storage advantages, for example, some types of storage can favor fast access, some can favor low cost, some can favor durability, etc. As such, an OES can be spread across different types of storage, e.g., different data storage tiers, to leverage an advantage offered by one or more tiers of data storage devices. As an example, a fast data access tier can be associated with higher cost than another less expensive but slower access tier of storage devices. In this example, newer events can be stored by the more expensive fast access tier, for example where newer events are more frequently accessed, and older events can be moved to the cheaper but slower other tier of storage devices. In embodiments, different tiers of storage devices can include tiers that use identical devices but apply a different storage technology via those devices, e.g., a first and second tier can each use SSDs, however the first tier can structure a portion of an OES as individual event objects stored via first tier SSDs while the second tier can structure another portion of the OES as files that each contain some ordered events. As such, a tiered OES data storage system can leverage different storage techniques, and/or different types of storage devices, to provide storage advantages over simply storing all events in identical storage devices according to single storage technique. It is noted that the disclosed subject matter is explicitly not limited to just two tiers of storage devices, however the majority of the instant disclosure is presented in terms of a first and second tier simply for the sake of clarity and brevity. In an example, a first tier can store a first portion of an OES that can include new incoming events. In this example, the first tier can then migrate older events to a second-tier store that can bundle events into data chunks, e.g., the second tier can employ a chunk storage technology. As such, in this example, the first tier can generally be maintained around a selected size without limiting the overall size of the example OES because portions of the example OES exceeding the selected size can be moved to the second-tier storage, e.g., as new events are created in the first tier, older events can be chunked and moved to the second tier. It is noted that the second tier could just as easily have employed a file storage technology, etc., in place of the example chunk storage technology, however these alternate storage technologies, while explicitly within the instant scope, are not further discussed at any length, again for the sake of clarity and brevity. Further detail of the disclosed subject matter can be illustrated in more detail hereinbelow.

Figure 2:
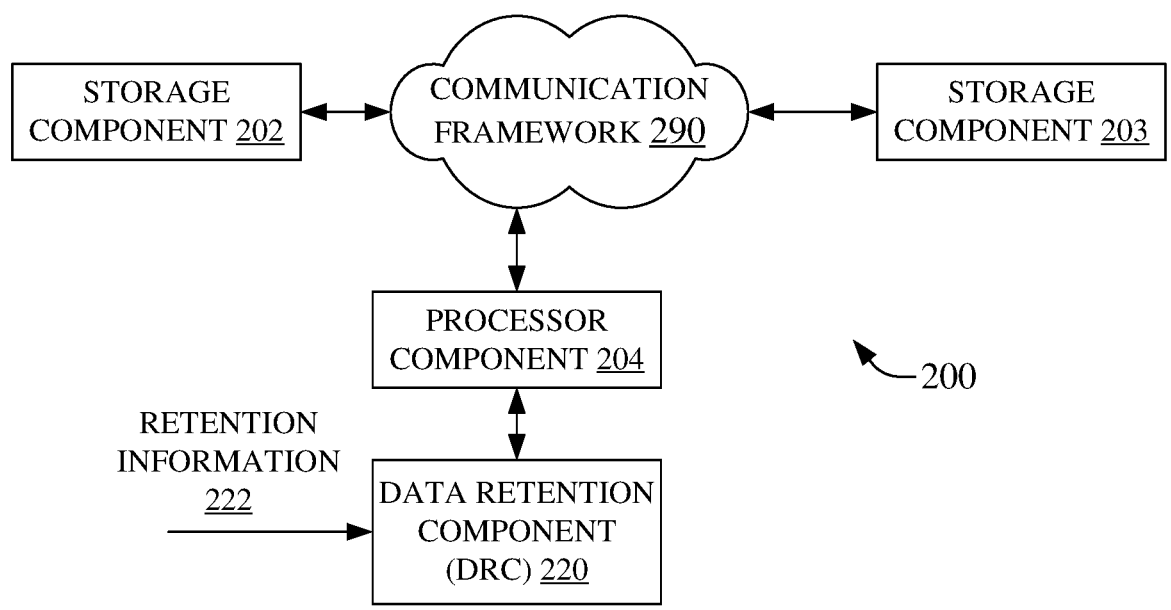
FIG. 2 is an illustration of one example embodiment that can enable control of data retention for an ordered event stream comprising a plurality of segments stored via a tiered ordered event stream data storage system.
Figure 2:
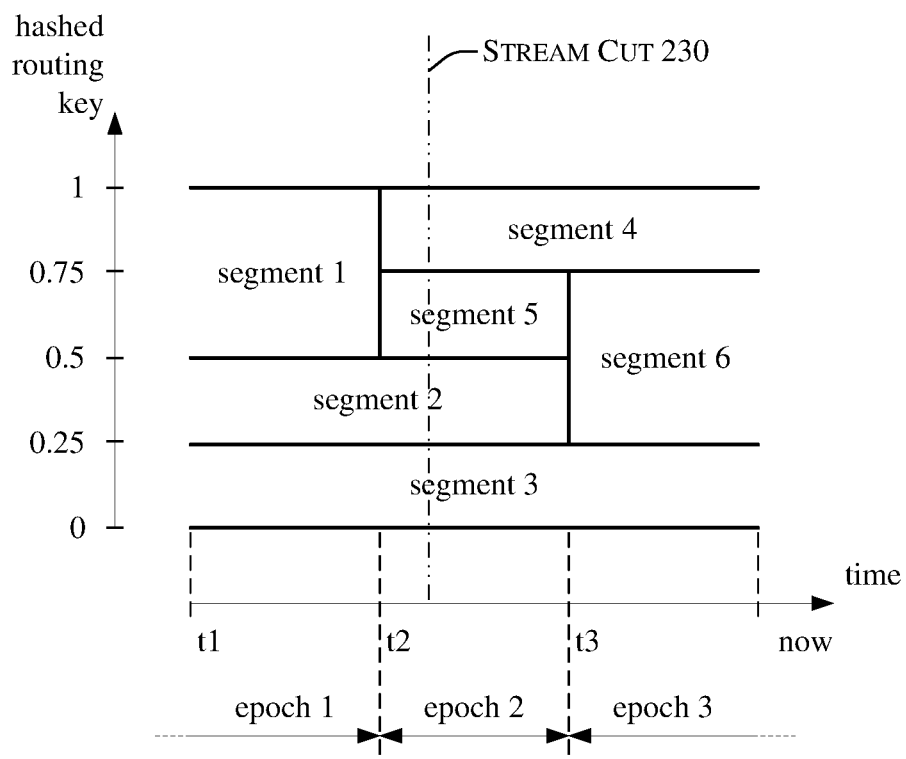

FIG. 2 is an illustration of an example system 200 enabling control of data retention for an ordered event stream comprising a plurality of segments stored via a tiered ordered event stream data storage system, in accordance with one or more embodiments of the subject disclosure. Generally, an OES can comprise segments corresponding to a key space topology, e.g., hashed routing keys between 0 and 1 as illustrated from segment 1 to segment 6, etc. At a first time, for example t1, a key space can correspond to one or more parallel segments, e.g., segment 1, segment 2, segment 3, etc. At some point a segment of the corresponding OES can be scaled. As an example, at t2, segment 1 can be scaled up. This can result in causing generation of segment 4 and segment 5 in the key space, and correspondingly sealing segment 1 therein. The topology of the OES comprising segments 1-3 pre-scaling, and the corresponding key space up to time t1, can be designated as epoch 1. Similarly, the topology of the OES comprising segments 4-5 and 2-3, and the corresponding key space between t1 and t2, can be designated as epoch 2, etc. It is noted that the inherent relationship between segment(s) of an OES and the corresponding portions of a key space of the OES can often result in mixing of the terms 'OES' and 'key space,' e.g., a key space can often be referred to as an OES, rather than a key space of the OES, for the sake of brevity. Such noted conventions are used hereinbelow for the sake of brevity, even where such nomenclature is technically less correct, unless implicitly or explicitly indicated otherwise, e.g., the reader of this disclosure is expected to appreciate the tight coupling between a key space and the corresponding OES is such that it is less wordy to simply refer to 'a key space illustrating the logical arrangement of OES segments,' as 'an OES.'

Segments of an OES can be continuous across an epoch and, in an example embodiment, segments 2 and 3 can be continuous across epochs 1 and 2 while segment 1 can end at the transition from epoch 1 to 2. In an example embodiment, in epoch 1, events associated with a key between 0.5 and 1, e.g., 0.5>key>1, can be written (and read from) segment 1, while in epoch 2, events associated with a key between 0.75 and 1, e.g., 0.75>key≥1.0, can be written (and read from) segment 4 and events associated with a key between 0.5 and 0.75, e.g., 0.5>key≥0.75, can be written (and read from) segment 5. As such, access to events for a given key can be associated with reads in different epochs. As an example, reading an event with a key of 0.8 can read from both segment 1 and segment 4. Where the read is from head to tail, the read of example events with a key of 0.8 can begin reading in segment 4 and then continue reading into segment 1 across the epoch boundary between epoch 2 and 1. Similarly, where the read is from tail to head, events associated with the example key of 0.8 can begin in segment 1 and continue into segment 4 across the epoch boundary. However, it is noted that generally no additional events are written into segment 1 after the scaling event is committed and a new epoch is begun.

In epoch 2, the topology of the OES can comprise segments 4-5 and 2-3. At some point further scaling can be undertaken, e.g., at t3. The OES, for example, can then scale down by condensing segment 2 and 5 into segment 6 at t3. This example scaling down can reduce a count of segments comprising the OES. The scaling at t3 can result in ending epoch 2 and beginning epoch 3. The example scaling can cay generate segment 6 and can close segments 2 and 5. As such, in epoch 3, the topology of the OES comprising segments 3-4 and 6 post-scaling can distribute the key space of the OES differently than in the previous epoch, for example, as 0≤segment 3>0.25, 0.25>segment 6≥0.75, and 0.75>segment 4≥1.0.

System 200 can comprise a communication framework 290 that can facilitate communications between local and/or remotely located components of system 200, see also communication framework 990, etc. events can be received and sent to storage devices of an OES data storage system via processor component 204 and communication framework 290. In an embodiment, storage component 202 can represent a first tier of data storage devices and storage component 203 can represent a second tier of storage devices. As an example, storage component 202 can comprise SSDs that store events in a manner that facilitates fast assess, e.g., storage component 202 can have a focus of quickly writing events to avoid an input-output operation (I/O) bottlenecking, supporting fast reading of events to enable operations predicated on events being stored in storage component 202, etc. Further, in this example, storage component 203 can comprise hard disk drives (HDDs) that can be more economical than the SSDs of storage component 202, which HDDs can have a focus of efficiently storing large amounts of less frequently accessed data by bundling events into chunk objects, herein generally referred to as 'chunks,' e.g., a chunk can aggregate a number of events, that can be stored via a chunk storage system. In this example, the chunk can maintain an OES event order in the chunk itself. As such, this example can embody storage component 202 storing a up to a first amount of events and then offloading older events beyond the first amount of events to storage component 203 for longer term storage. The illustrated embodiment in system 200 can then keep a 'reasonable amount' of fresh events at storage component 202, etc., while older events can be aggregated into chunks and written to an object storage system at storage component 203, etc., where a chunk can be an ordered list of events.

Storage system 200 can comprise operations that can truncate an OES, allowing system 200 to cut an OES short by deleting least events from an OES. When a stream needs to be cut short, system 200 can employ a stream-cut object, hereinafter a 'stream-cut' or 'cut,' for brevity. A stream-cut can indicate a position in an OES that is at a boundary between events, e.g., at an event boundary so that cutting the stream is not 'through' an event but rather between whole events. It is noted that cuts can occur in any tier of storage devices. Moreover, in an OES having more than on segment, a stream-cut can have a composite position that goes through all segments. As such, a request to truncate a stream can result in all events older than the cut being removed across all segments of the stream. Stream-cuts can facilitate management of the size of an OES, otherwise the unbounded nature of an OES can cause truly massive OES sizes. In example embodiments, a stream-cut can be generated periodically in an OES, can be greeted in response to a trigger, etc. In an example, an OES can comprise a rule that generates a stream-cut every 1,000,000 events. In this example, the OES can comprise a second rule that limits OES size to 100,000,000 events. As such, the OES can be truncated, for example, by cutting the stream from 100,000,000 events to 99,000,000 events via a $99^{th}$ stream-cut prior to generating an otherwise $100,000,001^{th}$ event.

It is noted that events can correspond to a retention period/time, e.g., embodied in retention information 222, etc. Generally, enterprise-level storage systems support data lifetime management (DLM) features, wherein data retention can be considered a prominent and valuable DLM feature. Data retention, for example, can support continued storage of data for compliance or business reasons, e.g., to comply with state and/or federal regulations, etc. A stream can support retention periods via stream-cuts, e.g., a retention end time (RET) can be determined for events, e.g., based on a retention time from retention information 222 received via DRC 220 and a stream-cut creation time. System 200 can actively prevent truncation of a stream based on stream-cuts and corresponding RETs, e.g., no stream data can be deleted during a retention period indicated via retention information 222. In this regard, DRC 220 can prevent truncation of one or more segments of an OES stored via one or more tiers of data storage devices, e.g., storage component 202, 203, etc.

Figure 3:
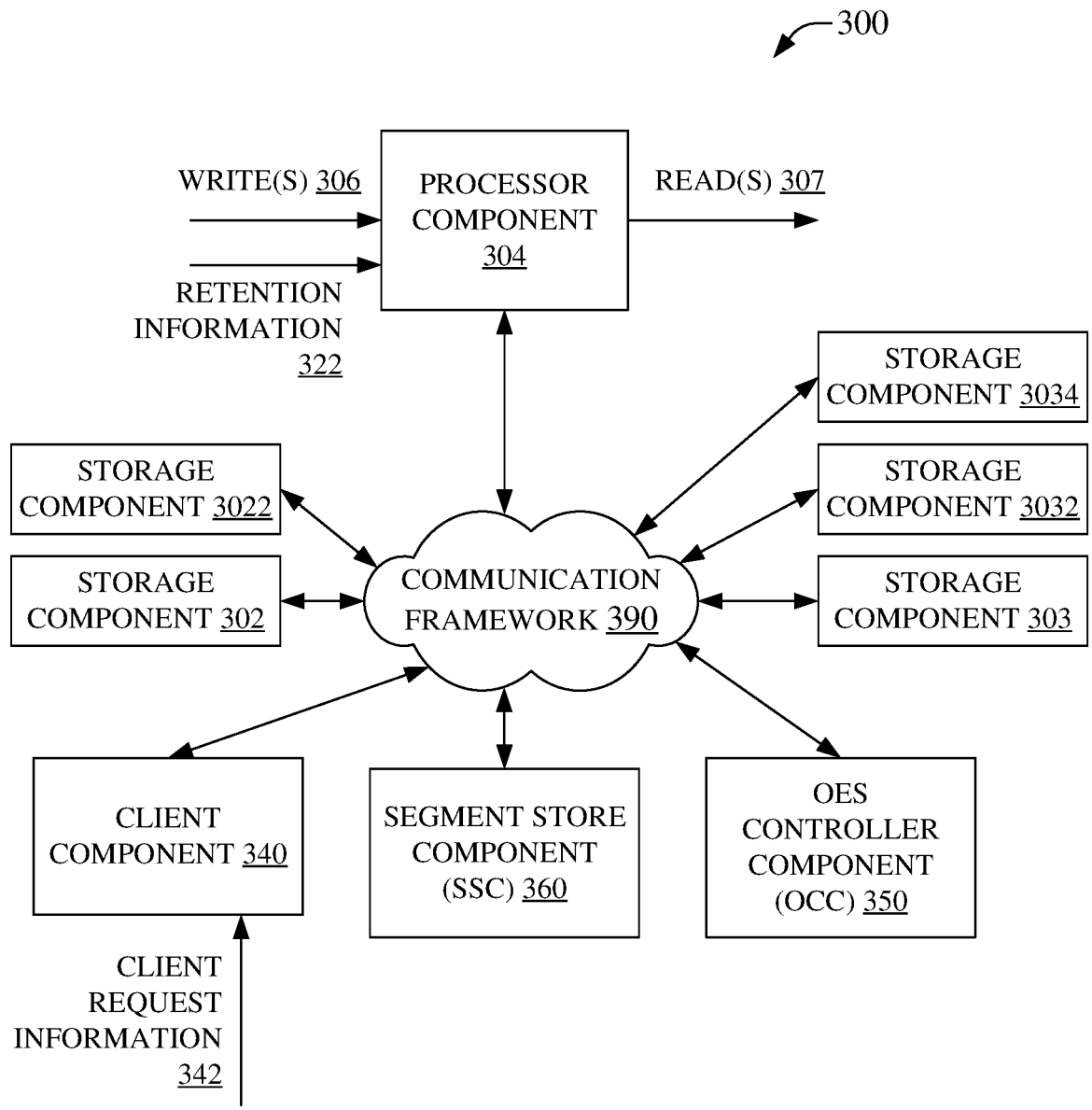

FIG. 3 is an illustration of a system 300, which can facilitate control of data retention for a spatially distributed tiered ordered event stream data storage system, in accordance with embodiments of the subject disclosure. System 300 can comprise processor component 304 that can receive write(s) 306 causing events to be written to an OES or portion thereof. Processor 304 can further generate read(s) 307 that can read events from an OES or portion thereof. Accordingly, system 300 can embody an OES via one or more storage components arranged in one or more tiers of storage components. As an example, storage component 302 can be part of a first tier of storage devices that can store first events of an OES. In this example, storage component 3022 can be a second storage devices, e.g., that can also be part of the first tier of storage devices, e.g., storage component 302 can be a storage node at a first data center and storage component 3022 can be another storage node at a second data center, wherein the first data center can be local to, or remote from, the second data center, allowing storage component 302 and 3022 to act as a distributed first tier of storage devices. Similarly, storage component 303 can be part of a second tier of storage devices, wherein storage component 3032 can be another storage device that can be local to, or remote from, storage component 303 and can be part of the second-tier storage devices. Further, storage component 3034 can be part of an additional tier of storage devices. Communication framework 390 can facilitate communication between various component of system 300.

Processing component 304 can receive retention information 322 that can indicate a retention period/time for events, streams, chunks, etc. While affiliating aa retention time with an event in a single tier of storage devices can be readily appreciated, embedding the retention time into events stored via other tiers of storage devices can be problematic. As an example, where event-level retention period is provided, this can differ from a stream-level retention period and, in this example, where events are aggregated into chunks at a different tier of storage devices, it can be important to affiliate an appropriate retention period with the chunks of the other tier to avoid unintentionally long retention of chunks in, or premature removal of chunks from, an OES.

In an example embodiment, system 300 can demote some OES segment data from a first tier to a second tier of storage, e.g., events can be demoted shortly after creation to keep the first-tier size small, after a week or some other time period, after a threshold count of events occurs or some based on some other non-temporal basis, etc. Demotion can indicate that events are moved between different tiers, for example from a fast first tier to a slower and cheaper second tier of storage devices, etc. In this example, the second tier can employ aggregation of events via chunk-type storage. A data retention component, e.g., DRC 120, 220, 420, 520, 620, etc., can be embodied via one or more combination of operations performed via processor component 304, client component 340, OES controller component (OCC) 350, and segment store component (SSC) 360. In embodiments, system 300 can comprise client component 340 that can provide an application programming interface (API) into system 300, e.g., client component 340 can receive client request information 342 that can impact OES topology, can facilitate implementation of demotion strategies, etc. System 300 can further comprise SSC 360 that can manage OES segments, generally independent of other components. SSC 360, for example, can manage automatic demotion of events from a first tier to another tier of storage devices, including aggregation of events into objects, files, etc. OCC 350, of system 300, can coordinate OES operations of system 300. In embodiments, OCC 350 can determine retention end times, manage write(s) 306, facilitate read(s) 307, etc. As such, there can be coordination, via communication framework 390, to manage retention times and stream-cuts in system 300. As an example, stream-cut objects can be created and maintained by the OCC 350, while event demotion can be managed by SSC 360, wherein retention of chunks can favorably be aligned with retention of any relevant stream-cuts, e.g., "stream-cutting" and "segment chunking" can be independent processes. In this regard, a stream-cut that points to the middle of a chunk can easily occur. Where a stream-cut points to the middle of chunk, the content of the chunk can end up being protected from deletion by two conflicting mechanisms, e.g., the stream-cut in the middle of the chunk and a retention time for the whole chunk that is derived from the retention time of all the events aggregated in the chunk. This can result in a lack of clarity as to which of the retention or cut should be adhered to for the example chunk.

In embodiments of the disclosed subject matter, retention times based on retention information 322 can be coordinated with stream-cuts in tiered OES data storage systems. In this regard, it is noted that a chunk retention time can preferably not be less than any of the events aggregated into the chunk, e.g., during a demotion of events from a first tier into a chunk stored via a second tier, the chunk should typically have a retention time that is as long as a longest retention time of an event being aggregated into the chunk. As such, if the chunk is deleted, it will not occur before the expiration of any retention period of any event aggregated into the chunk. Moreover, it is noted that the chunk can have a retention time that can preferably not exceed a nearest next stream-cut time. In this regard, the chunk should permit deletion of events up to the next stream-cut event. However, the deletion of the chunk permitting deletion up to the next stream-cut preferably does not permit deletion of events that are still subject to a retention time. Further, chunks are preferably deleted in their entirety, e.g., deletion of a portion of a chunk is not permitted. As an example, a chunk-type storage system employed as a second tier of storage devices can use chunks that are sealed once filled, e.g., the contents of the chunk are immutable. Accordingly, deletion of some events from a chunk is not permitted in the chunk itself and would typically require a second chunk be generated with the remaining events to permit deletion of the entirety of the first chunk, e.g., copy out the retained events then delete the entire original chunk, which can be an inefficient use of computing resources. As such, chunks can preferably be written that both permit deletion up to a next stream-cut and also do not permit deletion of any aggregated event that would be subject to retention beyond the stream-cut, e.g., an event storage constraint can be determined for a generated chunk such that SSC 360 can use event storage constraints to manage chunks of a tiered OES data storage system, e.g., system 300, etc.

FIG. 4 is an illustration of a system 400 that can enable demoted data retention via a tiered ordered event stream data storage system, in accordance with embodiments of the subject disclosure. System 400 can comprise DRC 420 that can receive retention information 422 and OES tail information 424. DRC can determine event retention constraint 426 that can enable retention of events in a tiered OES data storage system. Retention information can correspond to a period, time, etc., that an event is to be retained, e.g., an event is typically not permitted to be deleted while under retention. As an example, events corresponding to some securities transactions can have a three-year retention period such that an event comprising securities transaction data would not be permitted to be deleted for three years form event creation.

Illustration 402 can represent an OES that can be stored in a tiered OES data storage system. Events can be generated, for example from t0 to t1, with future generation of events occurring to the right of t1, e.g., as 'future events' in illustration 402. Illustration 402 can evolve into illustration 404. In illustration 404, newer events than those up to t1 can be written between t1 and t2, e.g., 'future events' from illustration 402 can be embodied in events written between t1 and t2. Further, a stream-cut can occur at sc1 as indicated in the time axis of illustration 404. Moreover, a retention period of an event at t1 can be determined to end at r1, e.g., the retention end time for an event at t1 can be the time t1 summed with a retention period to yield the time r1. In this example, the events of the OES represented in illustration 402, 404, and 406, can all have a same retention period, e.g., all events can be subject to non-deletion for the same amount of time from their corresponding creations. Accordingly, an event created at t0 can be understood to have a retention end time, not illustrated, that is earlier than the r1 retention end time for an event created at t1. As an aside, it is noted that r1 and/or sc1 can occur further to the right in the timeline of illustrations 404 and 406, e.g., r1 and sc1 can still be at some time in the future, without departing from the scope of the instant disclosure, however this is not depicted for the sake of clarity and brevity.

In illustration 406, events between t0 and t1 can become subject to demotion, e.g., the events generated between t0 and t1 can be subjected to aggregation into a chunk that can be stored via another tier of storage devices. Accordingly in this example, where all events between t0 and t1 have a retention time less than r1, the chunk aggregating these events can be affiliated with r1 as a retention end time, e.g., the RET(chunk)=r1. It can be observed in illustration 404 and 406 that sc1 occurs more recently than r1 and, as such, the stream cut at sc1 will only occur after r1 occurs and will therefore not impact RET(chunk) for the demoted events t0 to t1. In this regard, the prohibition against deleting the chunk aggregating events t0 to t1 will expire at r1, whereby any stream truncation that would remove the chunk from the stream occurring at sc1 would occur after the expiration of the prohibition associated with r1. It is noted that sc1 can impact other chunks that can aggregate other events between t1 and t2, however illustration 404 and 406 do not address chunks other than the chunk aggregating events between t0 and t1. It is further noted that where events between t0 and t1 can have irregular retention periods, e.g., events between t0 and t1 can have the same or different same retention periods, then r1 in illustrations 404 and 406 can represent a 'latest' retention end time for any event between t0 and t1, e.g., r1=RET(max for events between t0 and t1). As is noted elsewhere herein, retention periods can be indicated via retention information 422.

In embodiments, OES tail information 424 can indicate sc1. In this regard, OES tail information can be received from an SSC, e.g., SSC 360, etc., which can be managing OES segments, generally independent of other components. Accordingly, an SSC can manage events between t0 and t1 written to a first tier of storage devices in relation to illustration 402. An OCC, e.g., OCC 350, etc., can manage placement of stream-cuts as part of coordinating OES management, e.g., the OCC can be responsible for generating sc1 according to one or more OES management operations, rules, criteria, etc. An OCC can request, from an SCC, OES tail information 424, e.g., a timeline offset between a stream-cut instance and an event, chunk, etc. Accordingly, OES tail information 424 can indicate stream-cuts timeline position(s) relative to events subject to demotion to another tier of storage devices. Where a RET(chunk) determined for events subject to demotion occurs before a next stream-cut, the resulting chunk can be affiliated with the RET(chunk), e.g., event storage constraint 526 can affiliate RET(chuck) =r1 for a chunk aggregating events generated between t0 and t1 in example illustration 406.

FIG. 5 is an illustration of a system 500, which can facilitate demoted data retention accommodating an intervening stream cut instance of a tiered ordered event stream data storage system, in accordance with embodiments of the subject disclosure. System 500 can comprise DRC 520 that can receive retention information 522 and OES tail information 524. DRC can determine event retention constraint 526 based on retention information 522 and OES tail information 524, which can enable proper retention of events in a tiered OES data storage system. Retention information can correspond to a period, time, etc., that an event is to be retained, e.g., an event is typically not permitted to be deleted while under retention.

Illustration 502 can represent an OES that can be stored in a tiered OES data storage system, e.g., via a first-tier storage device, etc. Events can be generated, for example from t0 to t1, with future generation of events occurring to the right of t1, e.g., as 'future events' in illustration 502. A stream-cut can be generated between t0 and t1, as illustrated. In embodiments, DRC 520, an OCC, e.g., OCC 350, etc., or another component can generate the stream cut sc1. In some embodiments, sc1 can be an autogenerated stream-cut that can occur in response to trigger, be generated based on a recuring period, etc. Illustration 502 can evolve into illustration 504. Sc1 is observed as occurring between the t0 and t1, e.g., a stream cut corresponding to sc1 would therefore truncate only some of the events between t0 and t1. It is noted here that sc1 is illustrated as between t0 and t1 to illustrate where the effect of the stream cut would impact ordered events of an OES, however a performance of the truncation operations corresponding to sc1 can actually occur at any time, for example, between t1 and r1, etc., however this is not illustrated for the sake of clarity and brevity.

In illustration 504, newer events than those up to t1 can be written between t1 and t2, e.g., 'future events' from illustration 502 can be embodied in events written between t1 and t2. Further, a retention period of an event at t1 can be determined to end at r1, e.g., the latest retention end time for any event between t0 and t1 can be the time r1. In this example, the events of the OES represented in illustration 502, 504, 506, and 508, can all have a same retention period, although it is expressly noted that other examples can have events that employ different retention times as has been noted elsewhere herein. Accordingly, r1 can indicate a 'latest' retention end time for any event created between t0 and t1 for the example OES. Again, as previously noted, r1 and/or sc1 can occur further to the right in the timeline of illustrations 504-508, e.g., r1 and sc1 can still be at some time in the future, without departing from the scope of the instant disclosure, however this is not illustrated in FIG. 5 for the sake of clarity and brevity.

In illustration 506, events between t0 and t1 can become subject to demotion, e.g., the events generated between t0 and t1 can be subjected to aggregation into a first chunk that can be stored via another tier of storage devices. Accordingly in this example, where all events between t0 and t1 have a retention time that does not exceed r1, the chunk aggregating these events can initially be affiliated with r1 as a retention end time, e.g., the RET(chunk)=r1. However, this initial assumption can be corrected where it can be observed in illustration 504-508 that sc1 occurs more recently than r1 and, as such, the stream cut at sc1 will occur before r1 occurs and will therefore impact RET(chunk) for at least some of the events to be demoted. In this regard, the prohibition against deleting the chunk aggregating events t0 to t1 will not yet have expired for all events between t0 and t1 before the stream cut at sc1 occurs, e.g., r1 occurs to the right of sc1. Accordingly, attempts to truncate the OES at sc1 would either delete events aggregated in to a first chunk and still under retention restrictions, or would fail to delete the first chunk due to the retention restrictions of at least some events of the first chunk and thereby defeat the stream-cut management of the OES. Neither of these outcomes is generally acceptable. Accordingly, event storage constraint 526 can indicate an alternate outcome.

In illustration 508, the occurrence of sc1 among events to be aggregated into a chunk with a later retention end time can be determined from OES tail information 524. Where sc1 occurs in the events to be demoted, the resulting chunk sc1 can be limited to aggregating events between t0 and sc1, rather than between t0 and t1. Where the chunk is generated to comprise events between t0 and sc1, then the events can be truncated up to sc1 at r1 without danger of also deleting events between sc1 and t1 that are otherwise not subject to the stream-cut at sc1. Moreover, limiting the chunk to events between t0 and sc1 avoids deletion of a partial chunk, which is typically undesirable as disclosed elsewhere herein. Accordingly, events between sc1 and t1 can be aggregated into a second chunk that can aggregate events between sc1 and t1'. It is noted that where all events between sc1 and t1' have a retention period that does not exceed r1, then this second chunk can also be accorded the RET(second chunk) =r1. It is noted that other stream-cuts that could affect the second chunk for demoted events between sc1 and t1' are not considered in illustrations comprised in FIG. 5. As before, OES tail information 524 can indicate stream-cut timeline position(s) relative to events subject to demotion to another tier of storage devices. Where a RET(demoted events t0 to t1) determined for events subject to demotion occurs after a next stream-cut, e.g., at sc1, generating a resulting chunk can be adapted, e.g., RET(chunk t0 to sc1)=r1, e.g., event storage constraint 526 can affiliate RET(chuck t0 to sc1)=r1 for a chunk attempting to aggregate events generated between t0 and t1 across a stream-cut instance, e.g., sc1 in example illustration 506, such that RET(chunk t0 to t1) is adapted to RET(chunk t0 to sc1) and events between sc1 and t1 are deferred into a later aggregation, e.g., a second chunk, for storage in another tier of OES data storage devices.

FIG. 6 is an illustration of system states 600-A to 600-D, which can facilitate demoted data retention accommodating an intervening stream cut instance via different tiers of a tiered ordered event stream data storage system, in accordance with embodiments of the subject disclosure. A tiered OES data storage system at system state 600-A can comprise storage component(s) 602 that can embody a first tier of storage devices, e.g., storage component 202, 302, 3022, etc. The system can comprise storage component(s) 603 that can embody a second tier of storage devices, e.g., storage component 203, 303, 3032, 3034, etc. Accordingly, events can be stored in an OES via storage devices of one or more tiers of storage devices, e.g., at state 600-A events can be written to storage devices of a first tier of storage devices of an OES data storage system. State 600-A illustrates that the second tier of storage devices, e.g., storage component(s) 603 do not yet store any events. In an embodiment, state 600-A can embody the storage of events illustrated in FIG. 5 at 502, e.g., events between t0 and t1 can be written to a first tier of storage. It is noted that sc1 among events t0 to t1 in state 600-A can reflect sc1 at 502 of FIG. 5. Similarly, at state 600-B, additional events can be written into the first tier of storage, e.g., events from t1 to t2, the second tier can remain without events. This can again be similar to events between t1 and t2 in 504 of FIG. 5.

Events between t0 and t1 can be subject to demotion, similar to that illustrated at 506 of FIG. 5. However, the occurrence of sc1 between t0 and t1 can result in a DRC, e.g., DRC 520, adapting a resulting chunk based on OES tail information, e.g., 524, etc., that can reflect the placement of sc1 between t0 and t1 and to the left of r1 indicated via retention information, e.g., 522. Accordingly, at state 600-C, events from t0 to sc1 can be aggregated and demoted, which can result in moving the resulting chunk from the first tier to the second tier of storage, e.g., demoted events t0 to sc1 can be aggregated into a chunk at storage component(s) 603 and removed from storage component(s) 602. I tis noted that the chunk now written to storage component(s) 603, e.g., a first chunk aggregating events between t0 and sc1, can be affiliated with an r1 retention end time, see FIG. 5 at 506.

Events between sc1 and t1 can then be subject to aggregation via another chunk. In an embodiment, a chunk can aggregate events between sc1 and t1', such as is illustrated at 508 of FIG. 5. At state 600-D, demoted events sc1 to t1' can be moved from first tier, e.g., storage component(s) 602, to second tier, e.g., storage component(s) 603. As previously noted, where events between sc1 and t1' do not have expiration periods extending beyond r1, these demoted events can be affiliated with the r1 RET.

In an unillustrated alternate generation of a second chunk, a chunk can be generated between sc1 and t1, rather than between sc1 and t1'. In this alternate chunk generation, it is already determined that events of this second chunk have retention periods that do not exceed r1 and thus r1 can be affiliate with a second chunk for events aggregated between sc1 and t1. It is noted that this alternative results in both the first and second chunks being underfilled, although chunks are typically all a unit size and just null padded, zero padded, etc. This can be in contrast to the illustrated second chunk for events between sc1 and t1' being considered a filled chunk such that only the first chunk is 'underfilled'.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more embodiments herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate control of data retention for a tiered ordered event stream data storage system, in accordance with embodiments of the subject disclosure. At 710, method 700 can comprise determining events of an OES to be demoted from a first tier of storage devices of a tiered OES data storage system to a second tier of storage devices of the OES data storage system. As noted elsewhere herein, events can be stored in a first tier of storage devices and can be moved, e.g., demoted, chunked, aggregated, etc., into a second tier of storage devices of an OES data storage system. As per other examples presented herein, an example first tier can facilitate hot data access while a second example tier can favor cooler data access, e.g., data can be moved from first tier expensive but fast storage to second tier cheaper but slower storage. In an embodiment, second tier storage can be a chunk-style storage that can aggregate first tier events into chunks for longer term storage. Other second tier storage types could be file-type, or other object-type storage technologies. In an example embodiment, at 710, a group of first tier events can be selected to be aggregated into a chunk to be stored via a second-tier storage device.

At 720, method 700 can comprise determining a maximum event retention time for the events to be demoted from the first to the second tier of storage devices. Events can be affiliated with retention times for the events. As an example, regulators can direct a financial institution to maintain records for at least a selected period. Accordingly, events can have retention periods associated with retention end time that can be determined by adding an event creation time with a retention period. Moreover, events can have the same or different retention times, for example 'all financial-type events' can have a common retention time, perhaps dictated by banking regulations, etc., while other events can have different retentions times. At 720, a maximum retention time of the group of events to be demoted from first tier to second tier storage can be determined, e.g., what is the latest retention time of all events that are intended to be aggregated in a second-tier chunk can be determined.

Method 700, at 730, can comprise determining an offset between an event of the events to be demoted and a stream-cut instance of the OES. Method 700 can determine if a stream-cut instance is present for the OES and, if so, where in time does the stream-cut occur. A stream-cut can be a tool used by OES management devices to prune OESs and, as such, can generally be distinct from event-level retention times. In some embodiments, stream-cut offsets, e.g., a time difference between an event and a next stream cut instance can be retrieved from a DRC, e.g., DRC 120, 220, 420, 520, etc., from segment store component 360, etc., or other processor component(s) 104-304, etc., that manage storage of OES events. Retrieving the offset can be, for example, based on a request from an OES controller component that can be coordinating OES operations, e.g., DRC 120, 220, 420, 520, etc., from OES controller component 350, etc., or other processor component(s) 104-304, etc.

At 740, in response to determining that the offset occurs later in time than the maximum retention event time, method 700 can comprise demoting the events from the first to the second tier of storage devices and affiliating the resulting demoted events with the maximum event retention time to permit removal of the demoted events only after the maximum event retention time. At this point method 700 can end. Method 700, at 740, can embody demotion of events that can be illustrated in FIG. 4 at 406, e.g., sc1 can occur after r1, where sc1 is a next stream cut for the OES, and where r1 can be the maximum event retention time from 720. Where sc1 occurs after r1, the stream-cut operation that can occur at sc1 will always occur after demoted events have exited their retention period, e.g., demoted events t0 to t1 can all be past r1 and therefore can be permissibly removable from the OES before reaching sc1. Accordingly, event data cannot be truncated for the OES prior to it being permissible to remove the data from the OES based on the maximum event retention time for those demoted events.

FIG. 8 is an illustration of an example method 800, which can facilitate control of data retention accommodating an intervening stream cut instance for a tiered ordered event stream data storage system, in accordance with embodiments of the subject disclosure. At 810, method 800 can comprise determining events of an OES to be demoted from a first tier of storage devices of a tiered OES data storage system to a second tier of storage devices of the OES data storage system. This can be the same as, or similar to method 700 at 710 and similarly, at 810, a group of first tier events can be selected to be aggregated into a chunk to be stored via a second-tier storage device.

At 820, method 800 can again comprise determining a maximum event retention time for the events to be demoted from the first to the second tier of storage devices, which can be the same as or similar to method 700 at 720. Accordingly, at 820, a maximum retention time of the group of events to be demoted from first tier to second tier storage can be determined, e.g., what is the latest retention time of all events that are intended to be aggregated in a second-tier chunk can be determined. Also similar to method 700 at 730, method 800, at 830, can comprise determining an offset between an event of the events to be demoted and a stream-cut instance of the OES. Method 800 can determine where in time a stream-cut instance occurs, where a stream-cut is determined to be present.

At 840, method 800 can depart from similarity to method 700 and can comprise demoting a portion of the events from the first to the second tier of storage devices in response to determining that the offset occurs earlier in time than the maximum retention event time. The portion of the events does not comprise events corresponding to a time after the stream cut instance. In this regard, the stream-cut can be determined to occur among the events such that some of the events occur before the stream-cut and other of the events occur after the stream-cut. Returning to FIG. 5, at 504-508 sc1 is observed as occurring between the t0 and t1, e.g., a stream cut corresponding to sc1 would therefore truncate only some of the events between t0 and t1. It is noted here that sc1 is illustrated as between t0 and t1 to illustrate where the effect of the stream cut would impact ordered events of an OES, however the performing the truncation corresponding to sc1 can occur at any time, for example, between t1 and r1, etc. The portion of demoted events can be affiliated with the maximum event retention time to permit removal of the portion of demoted events only after the maximum event retention time. At this point method 800 can end.

Method 800, at 840, can embody demotion of some events, for example into an underfilled chunk so that the chunk does not also comprise events that are not to be truncated in response to a given stream cut instance. Accordingly, the use of a chunk to aggregate only the portion of the events proper to be affected by the stream-cut instance can avoid partial deletion of chunks, etc. The portion of events to be aggregated can be affiliated with the maximal retention time for the events of that portion of events to prevent permitting truncation of that portion of the OES prior to it being permissible to remove the data based on the maximum event retention time for those demoted events.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, 202, 203, 302, 3022, 303, 3032, 3034, 602, 603, etc., a remotely located processor device comprised in processor component 104, 204, 304, etc., a remotely located device comprised in data retention component 120, 220, 420, 520, etc., client component 340, etc., segment store component 360, etc., OES controller component 350, etc., or other remotely located components connected to a local component via communication framework(s) 290, 390, 990, etc. Communication framework 990 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, 202, 203, 302, 3022, 303, 3032, 3034, 602, 603, etc., a local processor device comprised in processor component 104, 204, 304, etc., a local device comprised in data retention component 120, 220, 420, 520, etc., client component 340, etc., segment store component 360, etc., OES controller component 350, etc., or other locally located components.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 990. Similarly, local component(s) 920 can be operably connected to one or more local data store(s) 930, that can be employed to store information on the local component(s) 920 side of communication framework 990. As examples, retention information 222, 322, 422, 522, etc., OES tail information 424, 524, etc., can be communicated form a remotely located component, via communication framework(s) 290, 390, 990, etc., to a local component to facilitate demoted data retention for a tiered OES data storage system, as disclosed herein.

In order to provide a context for the various embodiments of the disclosed subject matter, FIG. 10, and the following discussion, are intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, 202, 203, 302, 3022, 303, 3032, 3034, 602, 603, etc., processor component 104, 204, 304, etc., DRC 120, 220, 420, 520, etc., client component 340, SSC 360, OCC 350, etc., or other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random-access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising determining a maximum event retention time for events of an ordered event stream that are selected for demotion from a first tier of data storage devices of a data storage system to a second tier of data storage devices of the data storage system and, in response to determining that a stream-cut instance of the ordered event stream is scheduled to occur later in time than the maximum event retention time, enabling demotion of the events from the first tier to the second tier of data storage devices, wherein the demotion results in demoted events that are not permitted to be removed from the ordered event stream prior to a current time transitioning the maximum event retention time. However, where it is determined that the stream-cut instance will occur earlier in time than the maximum event retention time, a first portion of the events that are intended to be truncated in response to performing a stream-cut operation corresponding to the stream-cut instance can be determined such that the first portion of the events can be demoted from the first tier to the second tier of data storage devices, and the demotion of the first portion of the events results in a first portion of demoted events that are not permitted to be removed from the ordered event stream prior to the current time transitioning the maximum event retention time.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line-controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (k) for millimeter waves is typically in the 1-mm to 10-mm range.

The term "infer," or "inference," can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, comprising:
determining a first group of events between a first time and a second time of an ordered event stream to be demoted from a first tier of data storage devices of a data storage system to storage in a chunk in a second tier of data storage devices of the data storage system, wherein the first tier of data storage devices employ a stream based storage technology, and the second tier of data storage devices employ a chunk based storage technology;
determining a event retention time for the first group of events;
determining a stream-cut instance of the ordered event stream;
in response to determining that a third time of the stream-cut instance does not fall between the first time and the second time of the ordered event stream, facilitating demotion of the first group of events from the first tier of data storage devices to storage in the chunk in the second tier of data storage devices, wherein the demotion of the first group of events comprises affiliating the event retention time with the chunk, and wherein the first group of events are not permitted to be removed from the ordered event stream prior to a current time transitioning the event retention time; and
in response to determining that the third time of the stream-cut instance falls between the first time and the second time of the ordered event stream:
facilitating demotion of a first sub-group of events of the first group of events between the first time and the third time from the first tier of data storage devices to storage in a first chunk in the second tier of data storage devices, wherein the demotion of the first sub-group of events comprises affiliating the event retention time with the first chunk, and wherein the first chunk is only partially filled, and
facilitating demotion of a second sub-group of events of the first group of events between the third time and the second time from the first tier of data storage devices to storage in a second chunk in the second tier of data storage devices, and demotion of a second group of events between the second time and a fourth time of the ordered event stream from the first tier of data storage devices to storage in the second chunk.

2. The device of claim 1, wherein the event retention time is based on an event creation time and a selectable event retention period, and wherein the selectable event retention period corresponds to an amount of time that an event of the first group of events is to be retained before permitting removal of the event from the ordered event stream.

3. The device of claim 2, wherein the event retention period is a different period than a first-tier period that corresponds to an amount of time that the first event resided in the first tier of data storage devices before being demoted.

4. The device of claim 2, wherein the first group of events of the ordered event stream is selected to be demoted based on a count of total events stored via the first tier of data storage devices.

5. The device of claim 2, wherein the first group of events of the ordered event stream is selected to be demoted based on an age of an oldest event stored via the first tier of data storage devices.

6. The device of claim 1, wherein the event retention time is a first event retention time, and wherein the operations further comprise determining a second event retention time to affiliate with the second chunk.

7. The device of claim 1, wherein the second tier of storage devices comprises a plurality of storage devices.

8. The device of claim 7, wherein a first storage device of the plurality of storage devices is located remotely from a second storage device of the plurality of storage devices.

9. A method, comprising:
identifying, by a system comprising a processor, a first group of events between a first time and a second time of an ordered event stream to be demoted from a first tier of data storage devices of a data storage system to storage in a chunk in a second tier of data storage devices of the data storage system, wherein the first tier of data storage devices employ a stream based storage technology, and the second tier of data storage devices employ a chunk based storage technology;

determining, by the system, an event retention time for the first group of events;

determining, by the system, a stream-cut instance of the ordered event stream;

in response to determining that a third time of the stream-cut instance does not fall between the first time and the second time of the ordered event stream: moving, by the system, the group of events from the first tier of data storage devices to storage in the chunk in the second tier of data storage devices, and affiliating the event retention time with the chunk, wherein the first group of events is not permitted to be removed from the ordered event stream prior to a current time passing the event retention time; and in response to determining that the third time of the stream-cut instance falls between the first time and the second time of the ordered event stream:

moving, by the system, a first sub-group of events of the first group of events between the first time and the third time from the first tier of data storage devices to storage in a first chunk in the second tier of data storage devices, and affiliating, by the system, the event retention time with the first chunk, wherein the first chunk is only partially filled, and moving, by the system, a second sub-group of events of the first group of events between the third time and the second time from the first tier of data storage devices to storage in a second chunk in the second tier of data storage devices, and moving, by the system, a second group of events between the second time and a fourth time of the ordered event stream from the first tier of data storage devices to storage in the second chunk.

10. The method of claim 9, wherein the second tier of storage devices comprises a plurality of geographically diverse storage devices.

11. The method of claim 9, wherein the event retention time is a first event retention time, and further comprising determining, by the system, a second event retention time to affiliate with the second chunk.

12. The method of claim 9, wherein the event retention time is based on an event creation time and a selectable event retention period, and wherein the selectable event retention period corresponds to an amount of time that an event of the first group of events is to be retained before permitting removal of the event from the ordered event stream.

13. The method of claim 9, wherein the first group of events of the ordered event stream are selected to be demoted based on a count of total events stored via the first tier of data storage devices.

14. The method of claim 9, wherein the first group of events of the ordered event stream are selected to be demoted based on an age of an oldest event stored via the first tier of data storage devices.

15. A non-transitory machine-readable storage medium, comprising executable instructions that, when executed by a processor of network device of a network provider, facilitate performance of operations, comprising:

determining an event retention time for a first group of events between a first time and a second time of an ordered event stream that are selected for demotion from a first tier of data storage devices of a data storage system to storage in an object in a second tier of data storage devices of the data storage system, wherein the first tier of data storage devices employs a stream based storage technology, and the second tier of data storage devices employs an object based storage technology;

in response to determining that a third time of a stream-cut instance of the ordered event stream does not fall between the first time and the second time of the ordered event stream, enabling demotion of the first group of events from the first tier to storage in the object in the second tier of data storage devices, and affiliating the event retention time with the object, wherein the first group of events is not permitted to be removed from the ordered event stream prior to a current time transitioning the event retention time; and in response to determining that the third time of the stream-cut instance falls between the first time and the second time of the ordered event stream:

moving a first sub-group of events of the first group of events between the first time and the third time from the first tier of data storage devices to storage in a first object in the second tier of data storage devices, wherein the demotion of the first sub-group of events comprises affiliating the event retention time with the first chunk, and affiliating the event retention time with the first object, and moving a second sub-group of events of the first group of events between the third time and the second time from the first tier of data storage devices to storage in the second object in the second tier of data storage devices, and moving a second group of events between the second time and a fourth time of the ordered event stream from the first tier of data storage devices to storage in the second object.

16. The non-transitory machine-readable storage medium of claim 15, wherein the second tier of data storage devices comprises a first data storage device located remotely from a second data storage device.

17. The non-transitory machine-readable storage medium of claim 15, wherein the event retention time is a first event retention time, and wherein the operations further comprise determining a second event retention time to affiliate with the second object.

18. The non-transitory machine-readable storage medium of claim 15, wherein the event retention time is based on an event creation time and a selectable event retention period, and wherein the selectable event retention period corresponds to an amount of time that an event of the first group of events is to be retained before permitting removal of the event from the ordered event stream.

19. The non-transitory machine-readable storage medium of claim 15, wherein the first group of events of the ordered event stream are selected to be demoted based on a count of total events stored via the first tier of data storage devices.

20. The non-transitory machine-readable storage medium of claim 15, wherein the first group of events of the ordered event stream are selected to be demoted based on an age of an oldest event stored via the first tier of data storage devices.

* * * * *